United States Patent [19]
Cadden et al.

[11] Patent Number: 6,044,394
[45] Date of Patent: Mar. 28, 2000

[54] MANAGING INDEPENDENTLY EXECUTING COMPUTER TASKS THAT ARE INTERRELATED BY DATAFLOW

[75] Inventors: William S. Cadden, Saugerties, N.Y.; Iwao Hatanaka, Acton, Mass.; Stephen Craig Hughes, Hyde Park, N.Y.

[73] Assignee: International Business Machines Corporation, Armonk, N.Y.

[21] Appl. No.: 08/898,305

[22] Filed: Jul. 21, 1997

[51] Int. Cl.[7] .................................................. G06F 9/00
[52] U.S. Cl. ........................................ 709/107; 709/100
[58] Field of Search .................................. 709/100, 104, 709/107, 102, 103, 300; 364/578; 395/680

[56] References Cited

U.S. PATENT DOCUMENTS

| | | | |
|---|---|---|---|
| 5,049,873 | 9/1991 | Robins et al. | 340/825.06 |
| 5,317,688 | 5/1994 | Watson et al. | 395/161 |
| 5,388,268 | 2/1995 | Beach et al. | 395/700 |
| 5,432,932 | 7/1995 | Chen et al. | 395/650 |
| 5,550,970 | 8/1996 | Cline et al. | 395/161 |

*Primary Examiner*—Majid A. Banankhah
*Attorney, Agent, or Firm*—Floyd A. Gonzalez, Esq.; Heslin & Rothenberg, P.C.

[57] ABSTRACT

A complex task is managed by controlling the independent, cooperating components that make up the complex task. This control includes, for instance, pre-run dynamic validation of the components of the complex task; programmatic determination of the proper order to start, stop or delete one or more of the components; post-run automatic recovery from a terminated component; and/or automatic collection of information regarding the independent, cooperating components, such that the overall status of the complex task is obtained and understood. The control is provided through a centralized mechanism that enables easy configuration, control and monitoring of the independent, cooperating components of a complex task.

81 Claims, 10 Drawing Sheets

POST-RUN AUTOMATED RECOVERY

6,044,394

1

MANAGING INDEPENDENTLY EXECUTING COMPUTER TASKS THAT ARE INTERRELATED BY DATAFLOW

TECHNICAL FIELD

This invention relates, in general, to processing of complex tasks within a computer environment and, in particular, to managing a complex task by providing a centralized control of the independent, cooperating components of the complex task.

BACKGROUND ART

In one example, a complex task includes a set of data-dependent, stand-alone applications, along with their various connections (e.g., pipes and links), which are used to process various pieces of data to complete a specific task or job. The components of a complex task (e.g., the applications, pipes and links) may be distributed across multiple computer systems of a computer environment or reside within one computer system.

In typical distributed computer environments of today, a complex task may be run across a network of heterogeneous operating systems. Specifically, a user individually invokes remote executions of various scripts/commands to run the complex task across the network of heterogeneous operating systems.

The user is faced with inherent management complexities when invoking the numerous applications over the several hosts and with communicating with different operating systems. This task has proved to be cumbersome, time-consuming and error prone.

For example, configuration errors can manifest themselves when the user provides insufficient or incorrect data to invoke the various components of the complex task. Data flow errors can occur if the output of one program does not properly transfer to become the input of another program. Data connection mismatches can occur if the characteristics of the data (e.g., name, host, etc.) are changed, but not propagated throughout the affected components of the complex task. Further, run sequence problems can occur when certain components must be run before others.

The detection of the errors has also proved to be problematic, since the errors do not surface until run-time.

Thus, a need exists for a centralized control for managing a complex task. A further need exists for a complex task management capability that offers pre-run dynamic validation of the various components of a complex task, programmatic determining of the proper order to start, stop and/or delete a component, post-run automatic recovery from a terminated component, and automatic collection of information regarding the various components, such that the overall status of a complex task is obtained and understood.

SUMMARY OF THE INVENTION

The shortcomings of the prior art are overcome and additional advantages are provided through the provision of a method and system of managing complex tasks of a computer environment. In one example, a method of managing complex tasks includes specifying a complex task to be executed. The complex task includes a plurality of independent, cooperating components. The method further includes controlling the plurality of independent, cooperating components to manage the complex task. The controlling includes at least one of:

dynamically validating at least one component of the plurality of independent, cooperating components prior to execution of the complex task;

2 programmatically determining a proper order for performing a start, stop, or delete of one or more components of the plurality of independent, cooperating components;

automatically recovering from a terminated component of the plurality of independent, cooperating components. The automatically recovering including automatically determining which, if any, of the plurality of independent, cooperating components are affected by the terminated component and managing those components that are affected; and automatically collecting information regarding data flow among the plurality of independent, cooperating components. The automatically collected information provides status of the complex task.

In one embodiment, the dynamically validating includes at least one of verifying an input of the at least one component; verifying one or more data flow directions for the at least one component; and verifying one or more data connections for the at least one component.

In another embodiment of the present invention, the programmatically determining a proper order for performing a start includes specifying that certain types of components of the complex task are to be started prior to others. Similarly, the programmatically determining a proper order for performing a stop includes specifying that certain types of components of the complex task are to be stopped prior to others. Further, the programmatically determining a proper order for performing a delete includes specifying that certain types of components of the complex task are to be deleted prior to others.

In yet another embodiment, the automatically collecting includes obtaining, substantially simultaneously, information regarding the plurality of independent, cooperating components. In one example, the information is obtained during one or more predefined time intervals.

In another embodiment of the present invention, a method and system of managing complex tasks of a computer environment are provided. In one example, the method includes specifying a complex task to be executed, in which the complex task includes a plurality of independent, cooperating components; and automatically collecting information regarding data flow among the plurality of independent, cooperating components, in which the collected information provides status of the complex task.

In another aspect of the present invention, a system of managing complex tasks of a computer environment is provided. In one example, the system includes:

at least one computing unit adapted to specify a complex task to be executed, in which the complex task includes a plurality of independent, cooperating components; and at least one computing unit adapted to control the plurality of independent, cooperating components to manage the complex task. The control includes at least one of:

dynamically validating at least one component of the plurality of independent, cooperating components prior to execution of the complex task;

programmatically determining a proper order for performing one of a start, stop, and delete of one or more components of the plurality of independent, cooperating components;

automatically recovering from a terminated component of the plurality of independent, cooperating components. The automatically recovering including automatically determining which, if any, of the plurality of independent, cooperating components are affected by the terminated component and managing those components that are affected; and automatically collecting information regarding data flow among the plurality of independent, cooperating components, wherein the automatically collected information provides status of the complex task.

In yet another aspect of the present invention, an article of manufacture is provided. The article of manufacture includes at least one computer useable medium having computer readable program code means embodied therein for causing the managing of complex tasks of a computer environment. The computer readable program code means in the article of manufacture includes, for instance:

computer readable program code means for causing a computing unit to effect specifying a complex task to be executed, in which the complex task includes a plurality of independent, cooperating components; and computer readable program code means for causing a computing unit to effect controlling the plurality of independent, cooperating components to manage the complex task. The computer readable program code means for causing a computing unit to effect controlling includes at least one of:

computer readable program code means for causing a computing unit to effect dynamically validating at least one component of the plurality of independent, cooperating components prior to execution of the complex task;

computer readable program code means for causing a computing unit to effect programmatically determining a proper order for performing one of a start, stop, and delete of one or more components of the plurality of independent, cooperating components;

computer readable program code means for causing a computing unit to effect automatically recovering from a terminated component of the plurality of independent, cooperating components. The automatically recovering including automatically determining which, if any, of the plurality of independent, cooperating components are affected by the terminated component and managing those components that are affected; and computer readable program code means for causing a computing unit to effect automatically collecting information regarding data flow among the plurality of independent, cooperating components, in which the automatically collected information provides status of the complex task.

The present invention advantageously provides a capability for easily configuring and controlling complex tasks from a centralized point of control. The present invention provides pre-run configuration validation; programmatic determining of the proper order to stop, start or delete one or more components of a complex task; automatic recovery from a terminated component; automatic collecting of information in order to obtain the overall status of a complex task; and message and status handling. Rapid data transfer rates, parallel processing and shortened execution time to complete a complex task are just some of the benefits.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a complex task management capability is provided, which offers centralized control of individual components of a complex task, such that the complex task can be efficiently and effectively managed. As one example, the overall status of a complex task can be obtained and understood by automatically collecting information regarding the individual components of the complex task and understanding how those components cooperate with one another (i.e., their data flow). The information related to the components is collected substantially simultaneously at predefined time intervals, so that the overall status of the complex task can be understood.

The complex task management capability of the present invention also manages the complex task by providing pre-run dynamic validation of the individual components and their connections, programmatically determining the proper order for starting, stopping or deleting one or more of the components, by providing post-run automated recovery and by offering a centralized message and status handler.

A complex task includes, for example, a set of data-dependent, stand-alone applications, along with their various connections (e.g., pipes and links), which are used to process various pieces of data to complete a specific task or job. That is, a complex task includes a plurality of independent, cooperating components. The components of a complex task (e.g., the applications, pipes and links) may be distributed across multiple computing units of a computer environment or reside within one computing unit.

Figure 1:
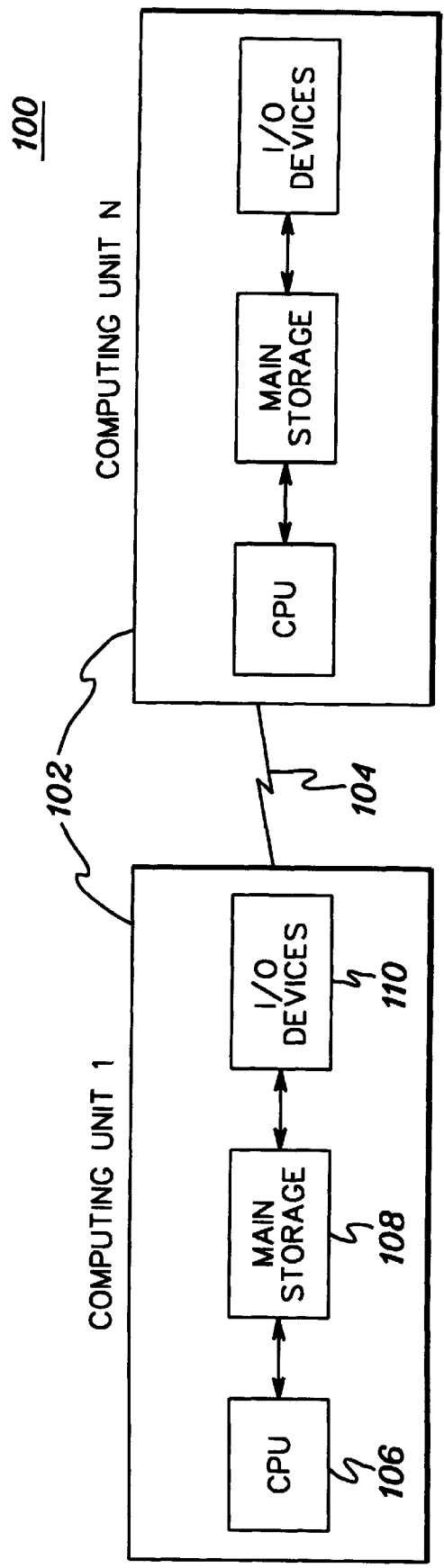
FIG. 1 depicts one example of a computer environment incorporating and using the complex task management capability of the present invention.

One example of a computer environment incorporating and using the complex task management capability of the present invention is described in detail with reference to FIG. 1.

In one embodiment, a computer environment 100 is a distributed computer environment including a plurality of computing units 102 coupled to one another via a connection 104. Each computing unit 102 includes, for instance, at least one central processing unit 106, a main storage 108 and one or more input/output devices 110, each of which is described below.

As is known, central processing unit 106 is the controlling center of computing unit 102 and provides the sequencing and processing facilities for instruction execution, interruption action, timing functions, initial program loading and other machine related functions. The central processing unit executes at least one operating system used to control the operation of the computing unit by controlling the execution of other programs, controlling communication with peripheral devices and controlling use of the computer resources.

Central processing unit 106 is coupled to main storage 108, which is directly addressable and provides for high-speed processing of data by the central processing unit. Main storage may be either physically integrated with the CPU or constructed in stand-alone units.

Main storage 108 is also coupled to one or more input/output devices 110. These devices include, for instance, keyboards, communications controllers, teleprocessing devices, printers, magnetic storage media (e.g., tape, disks), direct access storage devices, and sensor based equipment. Data is transferred from main storage 108 to input/output devices 110, and from the input/output devices back to main storage.

In one example, computer environment 100 includes two computing units, one of which includes an RS/6000 SP workstation running an AIX operating system, and the other includes an S/390 mainframe running a Multiple Virtual Storage (MVS) operating system. The two computing units are coupled to one another via a network connection, such as TCP/IP or ESCON, as examples. RS/6000 SP, S/390, AIX, MVS, and ESCON are offered by International Business Machines Corporation.

The above-described computer environment is only one example, however. A computing unit can include other types of nodes, computers, processors, systems, workstations, mainframes and/or environments without departing from the spirit of the present invention. Additionally, two or more computing units may be coupled to one another via various connections. Each of the coupled units may be of the same type, of a different type or of any combination therebetween. Similarly, the operating systems may be similar or different. Likewise, the computing units may be coupled to one another via various connections. As a further example, the computer environment may include one computing unit in which the complex task is executed thereon. Again, the complex task management capability of the present invention can be incorporated and used with various types of computing units, computers, processors, nodes, systems, workstations, mainframes and/or environments, without departing from the spirit of the present invention.

Figure 2:
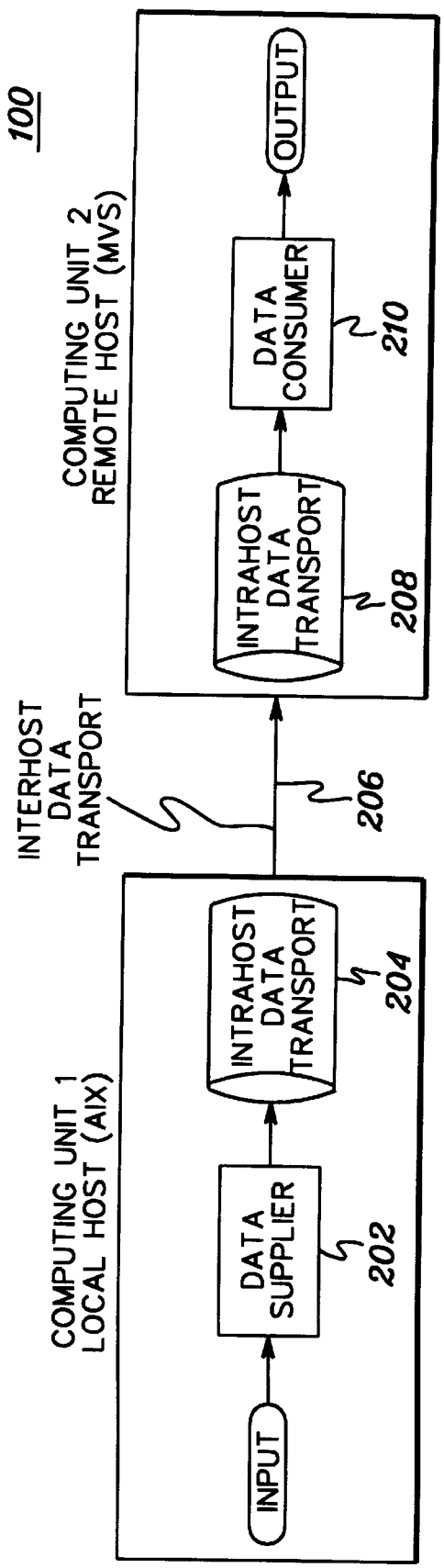
FIG. 2 depicts one example of the various components of a complex task, in accordance with the principles of the present invention.

One example of a complex task executing within computer environment 100 is described with reference to FIG. 2. The complex task is distributed across two computing units 102, one of which is referred to as a local host and the other is referred to as a remote host. In this embodiment, the local host is running AIX and the remote host is running MVS. The complex task includes, for example, a data supplier 202, an intrahost data transport 204, an interhost data transport 206, another intrahost data transport 208, and a data consumer 210, each of which is described below.

Data supplier 202 includes, for instance, an application that generates data; or files, datasets or tapes located on Computing Unit 1. Since Computing Unit 1 is executing AIX, an application would include anything that can be executed on AIX. For instance, it may include commands, shell scripts, and executable files. An application does one or more of the following: runs stand-alone on local or remote computing units; produces output that is piped to a local or remote computing unit; receives as input data that is piped from a local or remote computing unit; and/or processes multiple inputs, outputs or both. As depicted in FIG. 2, data supplier 202 receives input and provides output to intrahost data transport 204.

Intrahost data transport 204 typically transports data from one application to another application on the same computing unit. (However, it can also be used to transport data across computing units, as described below.) In one embodiment, intrahost data transport 204 includes a pipe (such as a Client Input Output/Socket (CLIO/S) pipe, described below), which allows two applications to communicate with each other. To one application, the pipe appears to be an output file; to the other, it appears to be an input file. As the first application writes to the pipe, the second application reads from the pipe. The data written to the pipe is not written to a storage device, such as tape or disk. Instead, it passes from one application to the next through memory. A pipe enables the execution of two applications to overlap, when the output of the first application is the input to the second application.

Although an intrahost data transport is described above as being between two applications on the same computing unit, in another embodiment, one intrahost data transport on one computing unit can be coupled to another intrahost data transport on another computing unit. In the example depicted in FIG. 2, intrahost data transport 204 on Computing Unit 1 is coupled to intrahost data transport 208 on Computing Unit 2 via interhost data transport 206.

Interhost data transport 206 enables data to be transported from one computing unit to another computing unit. In one example, interhost data transport 206 includes a CLIO/S pipe link, which is described in detail in "IBM Client Input Output/Sockets (CLIO/S) User's Guide and Reference," Version 2 Release 2.0, GC28-1676-01 (October 1996), which is hereby incorporated herein by reference in its entirety. (CLIO/S pipes are also described in the above incorporated by reference publication.)

As described above, interhost data transport 206 is coupled to intrahost data transport 208 on Computing Unit 2. Intrahost data transport 208 also includes, for instance, a pipe. In one example, the pipe is an MVS BatchPipe, which is described in detail in "BatchPipes/MVS User's Guide and Reference", GC28-1215, and in "IBM SMARTBATCH For OS/390 User's Guide And Reference", Publication Number GC28-1640-00, First Edition, March 1997, both of which are offered by International Business Machines Corporation, and both of which are hereby incorporated herein by reference in their entirety.

The output of intrahost data transport 208 is a data consumer 210. Data consumer 210 includes, for instance, an application that consumes data; or files, datasets or tapes located on Computing Unit 2. Since Computing Unit 2 is executing MVS, the application includes anything that can be executed on MVS, such as a job. Applications are further defined above with reference to data suppliers. The data consumer produces output.

In accordance with the principles of the present invention, a single point of control is provided, which allows a user to easily configure and monitor the components of a complex task. In one embodiment, this single point of control is provided through a graphical user interface (GUI). The graphical user interface facilitates configuration of applications and their associated connections (e.g., pipes and links), since the components are represented visually and can be manipulated with the graphical user interface.

In one example, the graphical user interface is an object-oriented interface including objects and actions that can be performed on the objects. The objects and at least a subset of the actions are represented by icons, which are easily recognizable for the user. Using the graphical user interface, the same set of actions can be performed on all the objects, without any predisposed knowledge of their innate operating systems and command set. As described below, each object includes information about the object and its status.

Figure 3:
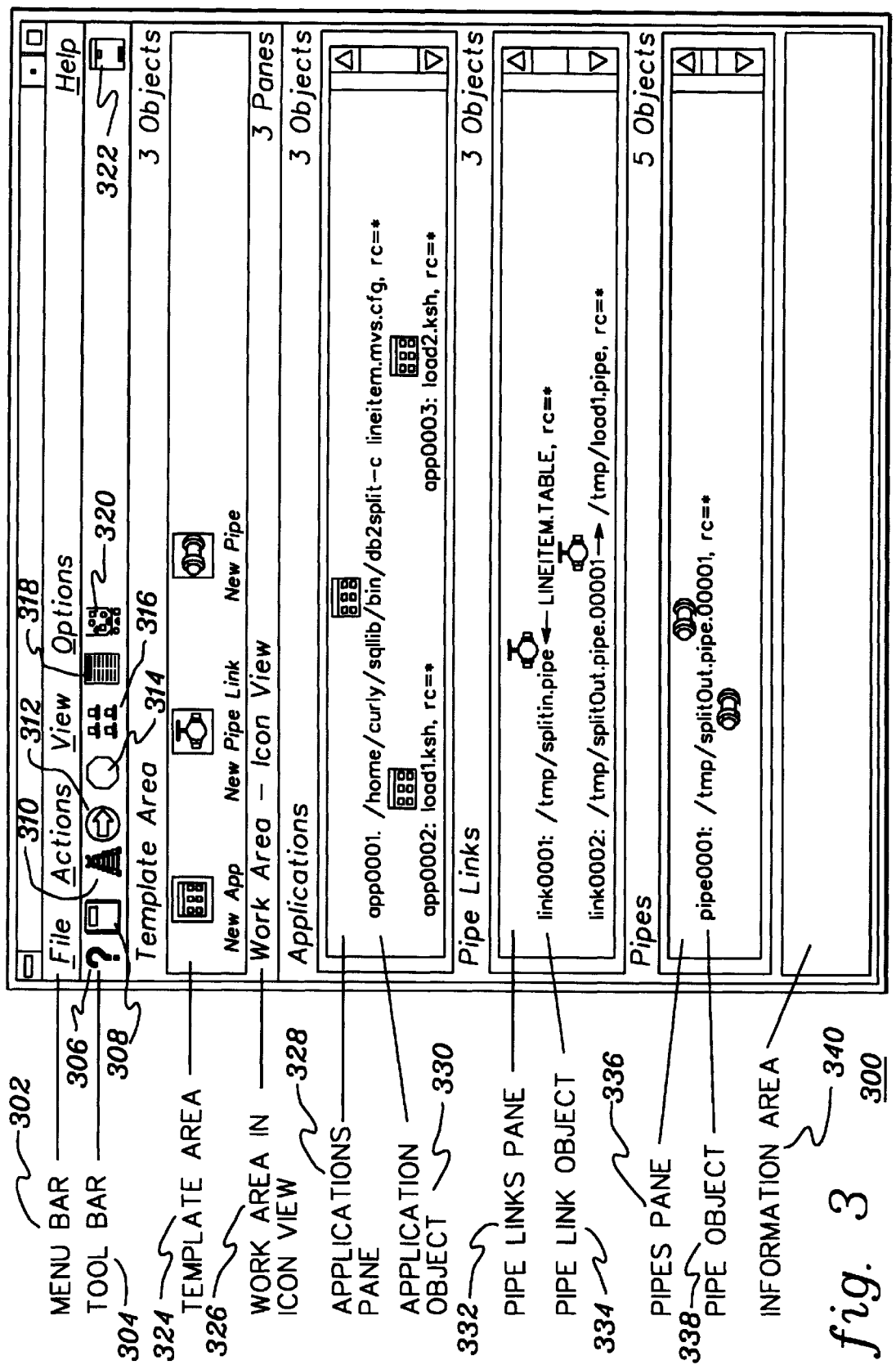
FIG. 3 depicts one example of a graphical user interface used in accordance with the principles of the present invention.

One example of a graphical user interface is depicted in FIG. 3 and described in detail herein. As is shown, a graphical user interface 300 includes, for instance, the following:

(A) A menu bar 302 containing pulldown menus for performing actions on the entire complex or on individual objects, as well as for tailoring features of the primary window (FIG. 3 is a depiction of one example of a primary window);

(B) A tool bar 304 containing icons representing frequently performed tasks, such as:
  (1) Help (icon 306), which displays context-sensitive help for a specific object, action or window area;
  (2) Notebook (icon 308), which displays a notebook for an application, pipe link or pipe objects. The notebook contains information that fully specifies the object and its status;
  (3) Signal (icon 310), which sends a signal to, for instance, an application or pipe link object. One example of a signal is an AIX interrupt command that can be used to stop or delete a real-world instance of an object, as described below. Another example of a signal is a user signal that can be sent to an application and understood by the application;
  (4) Start Configuration (icon 312), which starts all objects of the complex task;
  (5) Stop Configuration (icon 314), which stops all objects in the complex task;
  (6) Icon View (icon 316), which displays work area objects in an icon view;
  (7) List View (icon 318), which displays work area objects in a list view;
  (8) Sort/Filter (icon 320), which sets sort criteria to change the display order of work area objects and/or set filtering criteria to include/exclude work area objects; and
  (9) Delete (icon 322), which deletes an object from the complex task.

(C) A Template Area 324 containing templates of objects for adding applications, pipe links and pipe objects to a complex task;

(D) A Work Area 326 allowing a user to view the complex task. In one example, the view is an icon view in which the objects are displayed as icons, with each type of object in a separate pane. For instance, there is an application pane 328 displaying application objects 330; a pipe links pane 332 displaying pipe link objects 334; and a pipes pane 336 displaying pipe objects 338.

(E) An Information Area 340 displaying a brief description of the window area, menu option, or item at the current cursor location. When the cursor is placed over an object icon in the Work Area, the object's name and host are displayed.

In addition to the above, additional windows may be used to show a display of the notebooks, a dialog box soliciting additional information that may be needed to complete an action, and/or message boxes containing a message identifier, message text, and push buttons to respond to the message.

In accordance with the principles of the present invention, a number of actions can be performed on the objects of a complex task. One of those actions is a create action, in which a user specifies that a particular object (e.g., an application, pipe or link) is to be a part of a complex task.

One embodiment for creating a component of a complex task is described in detail with reference to FIG. 4. Initially, the user specifies a component of the complex task to be created, STEP 400. This can be accomplished using, for instance, the graphical user interface in which the appropriate icon in the Template Area is selected. For instance, if the user wishes to indicate that a particular application is to be a part of the complex task, then the user selects (e.g., clicks on) the new application icon in the Template Area. Then, an object creation dialog, in the form of a notebook, is displayed to allow the user to define the new object. The user specifies various information, such as the application name, any input to the application, any outputs of the application, the computing unit in which the application is to run, user id and/or password.

In accordance with the principles of the present invention, if a pipe is specified as an input to or an output of the application, then the pipe automatically becomes a part of the complex task. It need not be separately identified.

However, a new pipe may be separately identified by a user in a similar manner to identifying an application. In particular, in one example, the user selects the new pipe icon in the Template Area, and an object creation dialog is displayed in order to define the new pipe. Information used to define the new pipe includes, for instance, the host, user id, password, the name of the pipe, the input and output of the pipe and the direction of the pipe (e.g., read or write).

Similar to identifying an application or a pipe, a pipe link can also be specified by a user. The pipe link is specified via, for instance, selection of the new pipe link icon in the Template Area of the graphical user interface. A creation dialog is displayed and information used to define the new pipe link may be supplied by the user. This information includes, for instance, one or more of the following: the input to the link (e.g., the input pipe name or a file/dataset); the output to the link (e.g., the output pipe name or a file/dataset); an identification of the local and remote hosts; the direction of the data flow (e.g., from local to remote or from remote to local); and/or the data type (e.g., ASCII, binary).

Subsequent to defining the particular component, a program representation of that component is created, in accordance with the principles of the present invention, STEP 402. In one example, the program representation includes an object defined in C++. For instance, an application object is created for each application component, a link object is created for each link component and a pipe object is created for each pipe component. One embodiment of the classes used in creating each of the above-mentioned objects is described in detail below.

Each of the individual classes for the applications, pipes and links are derived from a base class, referred to as Object. The Object class provides a common interface for managing the connectivity and data flow in a network of objects. Specifically, this involves adding, retrieving and deleting inputs and outputs. It also includes querying whether an object is connected to an input or output and, if so, how many. The Object also provides the interface and implementation for recording and supplying information about the real-world invocation that the object represents. This information includes, for instance, the state of the invocation (e.g., Not Started, Starting, Running, Stopping, Stopped, Error and other internal states used in managing the invocation), the time it was started, any secondary invocations related to this object (e.g., a data link from one host to another will have a primary invocation on one host and a secondary invocation on another), the host where the invocation is running and the path to get to that host (often, one host is not directly accessible from another, but there may be a third host (or other hosts) that is accessible to both), the number of real-world invocations used to implement this object and unique identifiers (e.g., process or job id) for each, the operating system of the host where the real-world invocation resides, the completion code once an invocation has terminated and information about data movement associated with an object file (e.g., identifier(s), bytes transferred, bytes transferred since last interrupt, transfer rate, maximum transfer rate and time since last activity).

The Object base class includes the following data, which is private and should be referenced/modified through member functions that access the data, unless otherwise specified:

(A) id—A unique identifier that maps this Object to its real-world instance.

(B) name—A character string that describes this Object. The interpretation of the name is specific to the derived type. For example, for applications, it is the name of the executable and its parameters. For pipes, it is the name of the pipe. For links, it is the name of the pipe that the link is connected to on one side. For other data sources (e.g., data sets) it is the name of the data source.

(C) node—The host name where the real-world instance is to exist.

(D) user—The user id that is to be used to instantiate the real-world instance.

(E) password—The password for the specified user id on the specified node.

(F) preconditions—A list of ids of objects that are to complete before this object is to be started. This allows the user to impose additional control on the components that make up the complex task.

(G) state—The state of the invocation (e.g., Not Started, Starting, Running, Stopping, Stopped, Error and other internal states used to manage the invocation).

(H) timeStarted—The time the real-world instance was started.

(I) relatedIDs—Any secondary invocations related to this object (e.g., a data link from one host to another will have a primary invocation on one host and a secondary invocation on another).

(J) numIDs—The number of secondary invocations related to this object.

(K) hostPath—The path to get to that host (often one host is not directly accessible from another, but there may be a third host (or more) that is accessible to both).

(L) OS—The operating system on the host where the real-world invocation exits.

(M) completionCode—The completion code once an invocation has terminated.

(N) bytesTransferred—The number of bytes of data processed or transferred by the real-world invocation.

(O) bytesTransferredSinceStart—If the transfer process was paused, the number of bytes transferred since it was last resumed.

(P) quiescentTime—The elapsed time since the last data transfer or processing activity.

In addition to the above-described data, the Object base class includes an interface having the following functions (all functions are public, instance functions unless otherwise noted):

(A) create—A static create() function takes the type of object to create as a parameter, obtains additional information in order to fully instantiate the object (either from saved data or solicitation of the user (graphically or otherwise)) and adds the newly created object to a list of objects.

(B) constructor—The constructor of Object is protected since it is not logical to attempt to instantiate an Object and the constructor should only be called as part of the process of instantiating a derived object. The constructor requires, for example, name, node, user and password.

(C) realWorld—The realWorld() function causes the object to (re-)register its current attributes with the computing unit actually instantiating the real-world instances. RealWorld() is called whenever the object changes itself (via the update() function) and should also be called whenever the object is told to change a single attribute (e.g., node). The parameter indicates whether the object needs to notify its GUI representation (some changes do not affect the GUI and other times efficiency dictates that a series of updates be applied to the GUI en mass instead of individually).

(D) start—The start function is used to tell the object that it has been started. A parameter passed in indicates whether the object should start itself. Sometimes the real-world instance may be started as a side effect of starting some other object. In this case, the start call is made to get this object in sync with the real-world instance and the parameter would indicate that it need not start itself.

(E) addInput, removeInput, addOutput, removeOutput—These are virtual functions that add or remove objects that supply input to or consume output of this Object. These functions exist to ensure that the link between an input and an output is bi-directional. Thus, when Object A is added as an input to Object B, Object B is added as an output of Object A. This is accomplished by using the protected functions described below to perform the primary operation on this Object (e.g., addInput invokes __addInput on this object, and the complimentary function on the Object passed in as a parameter (e.g., A.addInput(B) invokes B.__addOutput(A)). These functions are virtual to allow derivations to perform semantic checking and adjustment before actually performing the addition or removal. Specifically, links and pipes (derived from Object), only allow one input and one output. When an object is added, checking is necessary to determine whether an object already exists. If it does, it can either be disconnected or the new addition can be disallowed, depending on implementation preference.

The protected functions include, for instance:

__addInput, __removeInput, __addOutput, and __removeOutput—These are protected virtual functions that manage the mechanics of recording the input(s) and output(s) of an object. They are virtual because managing the input(s) and output(s) depends on whether the derivation from Object supports multiple inputs and outputs or not. They are protected because they are intended to be invoked only by the public add and remove functions described above.

(F) hasInput, hasOutput, isConnected, getInputCount, getOutputCount, getFirstInput, getFirstOutput—These are virtual functions that return information about the number and type of inputs and/or outputs an object has.

(G) validate—The validate() function verifies that the object is in a complete and consistent state. At the Object level, validate() ensures that the real-world invocation is ready to start (i.e., has not already been started and not completed) and that sufficient information is available to perform operations on behalf of the user on the target host (a userid has been specified and a password has been specified or exists in a specified file). This function is virtual because derived types can perform additional checking by applying knowledge about the role this object plays in the overall complex task.

(H) changed—changed is a static function that indicates whether any object has been modified since the last time the complex task was saved. It is static because any object change means the entire complex task has changed.

(I) __setName, __setNode, __setUser, setPassword—These functions change basic information in the object. They are virtual to allow derived objects to determine the syntactical validity of the new value before actually applying the change. Syntactic validity is a factor of both the derived type (valid application names are different than valid pipe names) and the implementation (a valid MVS application name is different from a valid Unix application name).

(J) okToChangeName, okToChangeNode okToChangeUser, okToChangePassword—These functions determine whether it is permissible to change the data members of the Object. The base implementation just ensures that the real-world instance is not currently instantiated, but the functions are virtual to allow derived classes to add additional checking.

(K) matches—Matches() optionally accepts a type (the same type that is specified to the create() function), an id, a name, a node, a user and a password. If this object's data members match all the specified parameters, the function returns true. Otherwise, it returns false. This function is used to locate an existing object based on values supplied by the user.

(L) printIt—Write a formatted representation of the object to the output stream.

(M) type—Return Run Time Type Information about this object. This is used for semantic information to ensure that an application does not read from or write to a link object directly.

(N) updateStatus—This function causes the object to obtain the current state information from its corresponding real-world invocation and to signal the object's graphical representation that the status has changed.

(O) stop—Stop() stops the associated real-world invocation for this object.

(P) generateCommand—This function creates the command string that is used to create the real-world invocation of this object. The string is specific to the type of object being registered.

Derived from the Object base class is an application class, which enhances the Object base class with data members that store input and output lists. The application class also customizes the Object interface for updating an application, validating an application, and working with the inputs and outputs of an application.

In one embodiment, the application class includes the following additional data, which is private and should be referenced/modified through member functions that access the data, unless otherwise specified:

inputs/outputs—The application class adds the lists of inputs and outputs to the Object class. These lists include pointers to objects that have been designated by the user as inputs to or outputs of the application.

The application class also includes the following interface having the following additional functions (The functions are public, instance functions, unless otherwise noted.):

(A) constructor—The application constructor uses the name, node, user and password parameters that are used by the Object base class and will optionally accept a list of IDs of objects whose real-world invocation should complete before the real-world invocation of this application is started.

(B) update—Updating an object is done as an atomic operation against all changing information simultaneously rather than as a series of changes to individual fields. This is because some legal multiple changes have no equivalent series of legal individual changes. For example, moving an application that outputs to Pipe P from Node X to Node Y, while changing the output to Pipe M, illustrates this if there is a Pipe P on Node Y and a Pipe M on Node X. If the Node is changed from X to Y without changing the output, the application outputs to the existing Pipe P (on Y), which is then renamed to M. If the Output is changed to Pipe M without changing the Node, the application outputs to Pipe M on Node X and Pipe M (not Pipe P) is moved to Node Y.

In one embodiment, the information used to update an application is name, node, user, password, input list, output list and the list of objects that are to complete before starting the real-world invocation.

(C) validate—In addition to the validation that occurs in the base Object function, the application validate() function also ensures that the node, user id and password of the input and output objects matches the node, user id and password of the application. The node check is done since an application cannot directly access data on a different system. The user id and password check is to ensure that the application will have the appropriate permissions to read or write the data.

(D) printIt—Override the Object function to write a formatted representation of the application to the output stream.

(E) type—Return a value to indicate this is an application object.

(F) setInputs—This function takes a list of names represented with character strings, locates an existing pipe object on the same host as the application with each name and makes that pipe an input to the application. If an existing pipe does not exist, one is created.

(G) setOutputs—This function takes a list of names represented with character strings, locates an existing pipe object on the same host as the application with each name and makes that pipe an output of the application. If an existing pipe does not exist, one is created.

(H) hasInput, hasOutput, getInputCount, getOutputCount, getFirstInput, getFirstOutput—These routines implement the interface declared in the base class, Object, but are overridden in application because an application stores its inputs and outputs in a list rather than as a single pointer.

(I) __addInput, __addOutput, __removeInput, __removeOutput—These are protected routines that implement the function declared in the base class, Object, but are overridden in application because an application stores its inputs and outputs in a list rather than as a single pointer.

(J) __setNode, __setUser, __setPassword—These routines provide the same function as the routines in the base class, Object, but are overridden because changing these values for an application requires that they also be changed for all inputs and outputs of the application.

(K) okToChangeNode, okToChangeUser, okToChangePassword—In addition to checking whether these fields can be changed in the base Object class, these routines also check that they can be changed in the inputs and outputs of the application without creating a name conflict or an ownership conflict (e.g., a pipe that is owned by one user because of the application it is connected to and another because of the link it is connected to).

(L) generateCommand—This function creates the command string that is used to create the real-world invocation of this application. The string is specific to applications.

(M) trimInputs, trimOutputs, augmentInputs and augmentOutputs—These routines take a list of object names and adjust the inputs or outputs of an application by removing the objects whose names are not on the list and adding objects that were not previously an input or output, but are now on the list. These are private functions that are invoked by an application in response to the user modifying characteristics of the application after it has been created.

In addition to deriving an application class from the base Object class, a link class is also derived from the Object base class. The link class enhances the Object base class with data members that store input and output lists. It also customizes the Object interface for updating a link, validating a link, and working with the inputs and outputs of a link.

In one embodiment, the link class includes the following additional data, which is private and should be referenced/modified through member functions that access the data, unless otherwise specified:

(A) input, output—These are pointers to the objects that are the single input and output of the Link.

(B) remoteName—This is the name of the other pipe the link is connected to. The name of the first pipe is given by the name of the link.

(C) remoteNode—This is the host that is connected to by the link.

(D) remoteUser—The user ID that owns the link on the remote side.

(E) remotePW—The password of the user ID on the remote side.

(F) direction—This indicates whether the link is reading data on the local side and writing to the remote side or reading on the remote side and writing to the local side.

In addition to the above, the link object maintains other information about characteristics of the data transfer that is used to physically accomplish the transfer, but is not actually germain to the management of the transfer. Examples of this information are whether the data is ASCII or binary, whether data conversion is performed and the size of the intermediate buffers used to transfer the data.

The link object also includes an interface having the following additional functions (All functions are public, instance functions unless otherwise noted.):

(A) constructor—The link constructor uses the name, node, user and password parameters that are used by the Object base class. It also uses the name, node, user and password for the remote side of the link and the direction of the link. It will optionally accept parameters that customize the transfer itself, but do not affect the management of the link.

(B) update—Updating a link is done as an atomic operation against all changing information simultaneously, rather than as a series of changes to individual fields. This is because some legal multiple changes have no equivalent series of legal individual changes. For example, moving the local or remote side of a link that is connected to Pipe P from Node X to Node Y, while changing the output to Pipe M, illustrates this if there is a Pipe P on Node Y and a Pipe M on Node X. If the Node is changed from X to Y without changing the output, the link becomes connected to the existing Pipe P (on Y), which is then renamed to M. If the link name is changed to M without changing the Node, the link becomes connected to Pipe M on Node X and Pipe M (not Pipe P) is moved to Node Y. In one example, the information used to update a link is name, node, user, password, remote name, remote node, remote user, remote password, direction and any additional data transfer parameters to the link.

(C) validate—In addition to the validation that occurs in the base Object function, the link validate() function also ensures that the remote name, node, user id and password fields have been specified. It further checks that the direction, node, user id and password of the link matches the node, user id, password and direction of the pipes it is connected to.

(D) isRead, isWrite—These functions access the direction of the link.

(E) getRemote—This returns the remote name of the link.

(F) getRemoteNode—This returns the remote node of the link.

(G) getRemoteUserid—This returns the user id that is used to instantiate the remote portion of the link.

(H) getRemotePassword—This returns the password for the remote user id.

(I) getInputName, getInputNode, getInputUserid, getInputPassword—These functions return the appropriate information about the pipe that is read by the link (regardless of whether that is the local or remote side).

(J) getOutputName, getOutputNode, getOutputUserid, getOutputPassword—These functions return the appropriate information about the pipe that is written to by the link (regardless of whether that is the local or remote side).

(K) \_setInputNameAndNode, \_setOutputNameAndNode, \_setLocalNameAndNode, \_setRmoteNameAndNode Changing the name and node of a link implies changing the name and node of the pipe that the link is connected to, if possible (if the pipe is not also connected to an application), and using or creating a different pipe, if the old one cannot be moved. As discussed in the update function, the name and node change are done simultaneously in order to determine the correct option.

(L) okToChangeInputNameAndNode, okToChangeOutputNameAndNode—As discussed in the update() function, a name and node change are considered to occur simultaneously in order to determine its validity.

(M) \_setUser, \_setRemoteUser, \_setInputUser, \_setOutputUser, \_setpassword, \_setRemotePassword, \_setInputPassword, \_setOutputPassword—Changing these characteristics of a link also change the characteristics of the pipe that the link is connected to so these routines attempt to effect the same changes on the connected pipe in addition to changing the link's fields.

(N) okToChangeInputUser, okToChangeOutputUser, okToChangeInputPassword, okToChangeOutputPassword—A link's user and password can be changed as long as the link is not running and the pipe that is connected to the link can also be changed.

(O) setRead, setWrite, Set the direction of the link, okToChangeDirection—A link's direction can be changed as long as it is not connected to a pipe that is also connected to an application.

Changing a link's direction reverses the direction of any pipes it is connected to. The direction of a pipe that is connected to an application cannot be changed because that would require moving the pipe from the input (or output) of the application to the output (or input) and that is too significant a change to be performed automatically.

(P) printIt—Override the Object function to write a formatted representation of the link to the output stream.

(Q) type—Return a value to indicate this is a link object.

(R) hasInput, hasOutput, getInputCount, getOutputCount, getFirstInput, getFirstOutput—These routines implement the interface declared in the base class, Object, but are overridden in link because a link has a single input and a single output.

(S) \_addInput, \_addOutput, \_removeInput, \_removeOutput—These are protected routines that implement the function declared in the base class, Object, but are overridden in link because a link has a single input and a single output.

(T) generateCommand—This function creates the command string that is used to create the real-world invocation of this link. The string is specific to links.

In addition to the application and link classes, a pipe class is derived from the Object base class. The pipe class enhances the Object base class with data members that store pointers to an input object and an output object. It also has a data member that stores pipe direction. It customizes the Object interface for updating a pipe, validating a pipe and working with the input and output of a pipe.

In one embodiment, the pipe includes the following additional data, which is private and should be referenced/ modified through member functions that access the data, unless otherwise specified:

(A) input, output—There is a pointer to one object representing the input and a pointer to one object representing the output of the pipe.

(B) direction—This is a flag indicating whether this pipe is read or written by an application.

In addition to the above, the pipe class includes an interface having the following additional functions (The functions are public, instance functions unless otherwise noted.):

(A) constructor—The pipe constructor uses the name, node, user and password parameters that are used by the Object base class. It also uses a direction.

(B) update—Updating a pipe is done as an atomic operation against all changing fields simultaneously rather than as a series of changes to individual fields. This is because some legal multiple changes have no equivalent series of legal individual changes.

For example, changing Pipe A on Node X to Pipe B on Node Y, when there already exists a B on X and an A on Y is not possible as a sequence of legal individual changes. A cannot be changed to B on Node X because there is already a B on X. The node of A cannot be changed from X to Y because there already is an A on Y. Therefore, the way to accomplish the change is to change name and node simultaneously.

(C) validate—In addition to the validation that occurs in the base Object function, the pipe validate() function also ensures that the pipe is properly connected. A pipe may connect an application to a link, a link to an application or a link to another link. Any other situation is flagged as an error.

(D) \_setName, \_setNode, \_setUser, \_setPassword These routines provide the same function as the routines in the base class, Object, but are overridden because changing these values for a pipe is only permissible if it does not create a duplicate definition of a pipe and does not create an ownership conflict with the objects the pipe is connected to.

(E) \_setDirection—This routine changes a read pipe to a write pipe and vice versa. If the pipe is connected to a link and the link is connected to another pipe, the direction of the second pipe must also be changed. (In one example, a link cannot be connected to two pipes with the same direction.) If a pipe is connected to an application, its direction cannot be changed (the movement of a pipe from input to output of an application is not done automatically, but can be done explicitly by the user).

(F) \_setNameAndNode—If both the name and node of a pipe are changed simultaneously, it can only be done if there is not already a pipe with the new name on the new node. It is immaterial whether there is a pipe with the new name on the old node or a pipe with the old name on the new node.

(G) okToChangeName, okToChangeNode, okToChangeNameAndNode, okToChangeUser, okToChangePassword, okToChangeDirection—These functions validate the proposed changes according to the rules described above.

(H) isRead, isWrite, setRead, setWrite—These functions set and access the direction of the pipe.

(I) printIt—Override the Object function to write a formatted representation of the pipe to the output stream.

(J) type—Return a value to indicate this is a pipe object.

(K) hasInput, hasOutput, getInputCount, getOutputCount, getFirstInput, getFirstOutput—These routines implement the interface declared in the base class, Object, but are overridden in pipe because a pipe stores its input and output as single pointers rather than a list.

(L) outputType, inputType, outputID, inputID—These routines return information about the objects that a pipe is connected to.

(M) __addInput, __addOutput, __removeInput, __removeOutput—These are protected routines that implement the function declared in the base class, Object, but are overridden in pipe because a pipe stores its input and output as single pointers rather than in a list.

(N) generateCommand—This function creates the command string that is used to create the real-world invocation of the pipe. The string is specific to pipes.

An additional class is also derived from the Object base class. This class is referred to as the Other class. The Other class enhances the Object base class with a data member that stores the type of data object it represents. This class represents, for example, data objects that are not under direct control of the complex task management capability of the present invention, but are assumed to exist in the environment where the complex task is running. Examples of such data objects are files, datasets, tape devices and other storage media. A primary purpose of this class is to allow the user to explicitly specify that a data flow is originated or terminated so that validation does not need to flag it.

The Other class includes the following additional data, which is private and should be referenced/modified through member functions that access the data, unless otherwise specified:

(A) inputs, outputs—The Other class adds lists of inputs and outputs to the Object class. These lists contain pointers to objects that have been designated by the user as inputs to or outputs of the Other data object.

(B) type—This field records what kind of data object this object represents and is used to record the user's specification and report back to the user.

The Other class includes an interface having the following additional functions (The functions are public, instance functions, unless otherwise noted.):

(A) constructor—The Other constructor uses the name, node, user and password parameters that are used by the Object base class. It also requires a type specification.

(B) realWorld—Because Other objects are not managed as part of the complex task, the function from the base Object class that creates instances of objects is overridden to do nothing.

(C) getDataType—Get the character representation of the type of other data object this object represents.

(D) printIt—Override the Object function to write a formatted representation of the Other object to the output stream.

(E) type—Return a value to indicate this is an Other object.

(F) hasInput, hasOutput, getInputCount, getOutputCount, getFirstInput, getFirstOutput—These routines implement the interface declared in the base class, Object, but are overridden in Other because Other stores its inputs and outputs in a list rather than as a single pointer.

(G) __addInput, __addOutput, __removeInput, __removeOutput—These are protected routines that implement the function declared in the base class, Object, but are overridden in Other because Other stores its inputs and outputs in a list rather than as a single pointer.

(H) validate—The validate() function verifies that the object is in a complete and consistent state. The Other data object has a unique validate routine because it throws an error if there are no inputs or outputs, signalling that this object can be deleted.

In accordance with the principles of the present invention, when an object corresponding to a component is created, it is automatically and dynamically validated to determine if it has been created correctly. This validation occurs at create time, instead of run time. Each of the objects is created with a validate function, as described above.

For example, if the object being created is an application object, then the following validation occurs:

(1) A check is made to determine whether the application has already been started. This is performed, for instance, by checking for the application id on the specified host.

(2) Another check is made to determine if sufficient information has been provided. For example, has a user id and a password been supplied.

(3) A comparison is made between the node, user id and password of the input and output objects with the node, user id and password specified for the application.

Validation is also performed for the other objects to be created, as described above in connection with the classes. By validating all of the components of the complex task, correctness and completeness of the entire complex task, including its data flow is checked. In particular, configuration errors can be surfaced at create time by verifying the input for the components, and data flow directions and connections can be verified prior to running the complex task.

For instance, if a pipe is specified as an output of an application, the direction of the pipe is checked to ensure it is accurate. Additionally, a check is made to ensure that the pipe is connected to a link whose direction is accurate and that the pipe on the other side of the link has a direction of read. Further, a check is made to ensure that the other pipe is specified as an input of an application. A check is made to ensure that each pipe has something that is writing to it and something that is reading from it.

Figure 4:
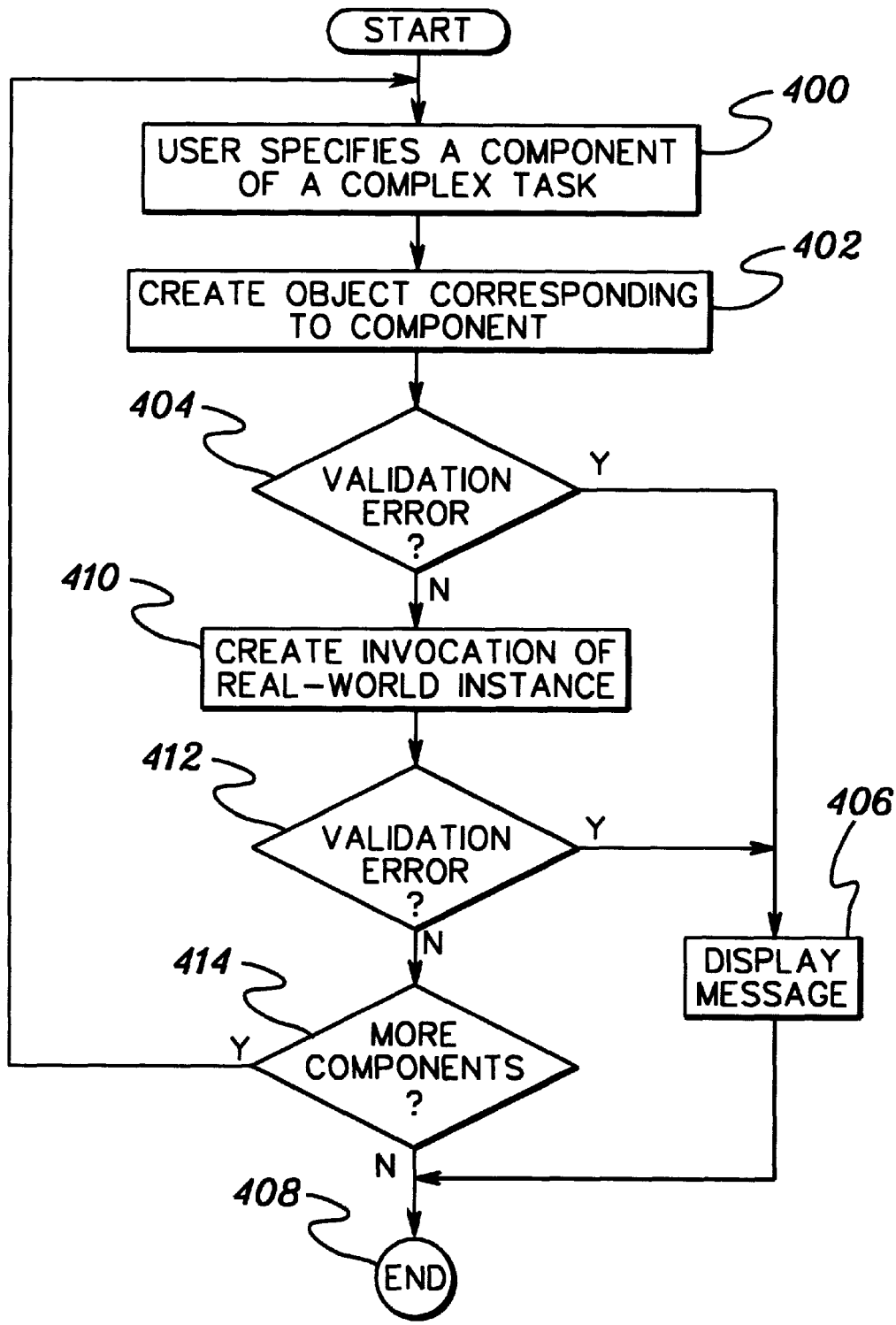
FIG. 4 depicts one embodiment of the logic associated with creating various components of a complex task, in accordance with the principles of the present invention.

When one or more of the validation checks fail, then an error is detected in the object creation, INQUIRY 404 (FIG. 4). Thus, an appropriate error message is displayed for the user, STEP 406. In one example, the error is displayed in a window of the graphical user interface. At this point, the initial creation is complete, STEP 408. However, the user has the opportunity to go back and correct the error. That is, the user can supply the needed information or correct any incorrect information that was previously supplied.

Returning to INQUIRY 404, if the validation is successful, then an invocation of a real-world instance corresponding to the object is created, STEP 410. For example, if the object just created is an application object to be run on a remote computing unit executing AIX, then an AIX rexec command (or a remote shell invocation) is created, as one example, containing the information needed to run the application. Similarly, if the application is to be run on a local computing unit, then the rexec command may be used designating the local unit or no special command need be used (i.e., the application can simply be run, at the appropriate time). Likewise, if the application is to be run on an MVS host, then Job Control Language (JCL) (offered by International Business Machines Corporation) necessary to run the application is built.

In another example, if the real-world invocation is of an AIX pipe, then an AIX mkfifo command is executed using the parameters provided by the user to create the pipe. One example of the mkfifo command is described in detail in "AIX Version 4 System User's Guide: Base Operating System," SC23-2544-02 (1996) offered by International Business Machines Corporation, which is hereby incorporated herein by reference in its entirety. Similarly, if the real-world invocation is of an MVS pipe, then an MVS BatchPipe is created, as described in detail in "BatchPipes/ MVS User's Guide and Reference," GC28-1215, and in "IBM SMARTBATCH For OS/390 User's Guide And Reference", Publication Number GC28-1640-00, First Edition, March 1997, both of which are offered by International Business Machines Corporation and both of which are hereby incorporated herein by reference in their entirety.

In yet a further example, if the real-world invocation is of a pipe link object, then a link is created between, for instance, a pipe on one computing unit and a pipe on another computing unit. In one example, the link includes two applications—one on one computing unit and one on the other computing unit. One embodiment of a pipe link is offered in the CLIO/S product offered by International Business Machines Corporation.

In one embodiment, the individual real-world instances of the complex task can be managed by an application programming interface. (However, this is not necessary.) The interface has no knowledge of how the individual pieces are connected, but does know how to create the individual invocations. In order to have the interface create the invocation, the complex task management capability provides a function call to the application programming interface. The parameters of the function call include, for instance, the information received from the user. Then, the interface creates, for instance, the appropriate rexec or JCL to create the real-world invocation. One example of such an application programming interface is included in the CLIO/S product offered by International Business Machines Corporation.

During creation of the real-world instances of the objects, validation may be performed in order to determine if the instances are ready to be run. For example, a determination may be made as to whether the computing unit in which the instance is to be run exists. Other checks may also be made.

If an error is found in the creation of the real-world instance, INQUIRY 412, then an error message is displayed to the user, STEP 406. Thereafter, the create process is complete, STEP 408. However, in one embodiment, the user has an opportunity to correct for the error and proceed with creating this object or a different object for another component.

Returning to INQUIRY 412, if no errors were encountered, and the user would like to specify additional components of the complex task, INQUIRY 414, then the create process continues with STEP 400. On the other hand, if no more components are to be added to the complex task, then the create process is complete, STEP 408.

After objects for all the components of a complex task are created, the complete data flow for the complex task is in place. In particular, the connections between the components (i.e., the objects) is automatically done by keeping track of the names of the objects and their inputs and outputs. This information is stored in each of the objects, as described in detail above.

Figure 5:
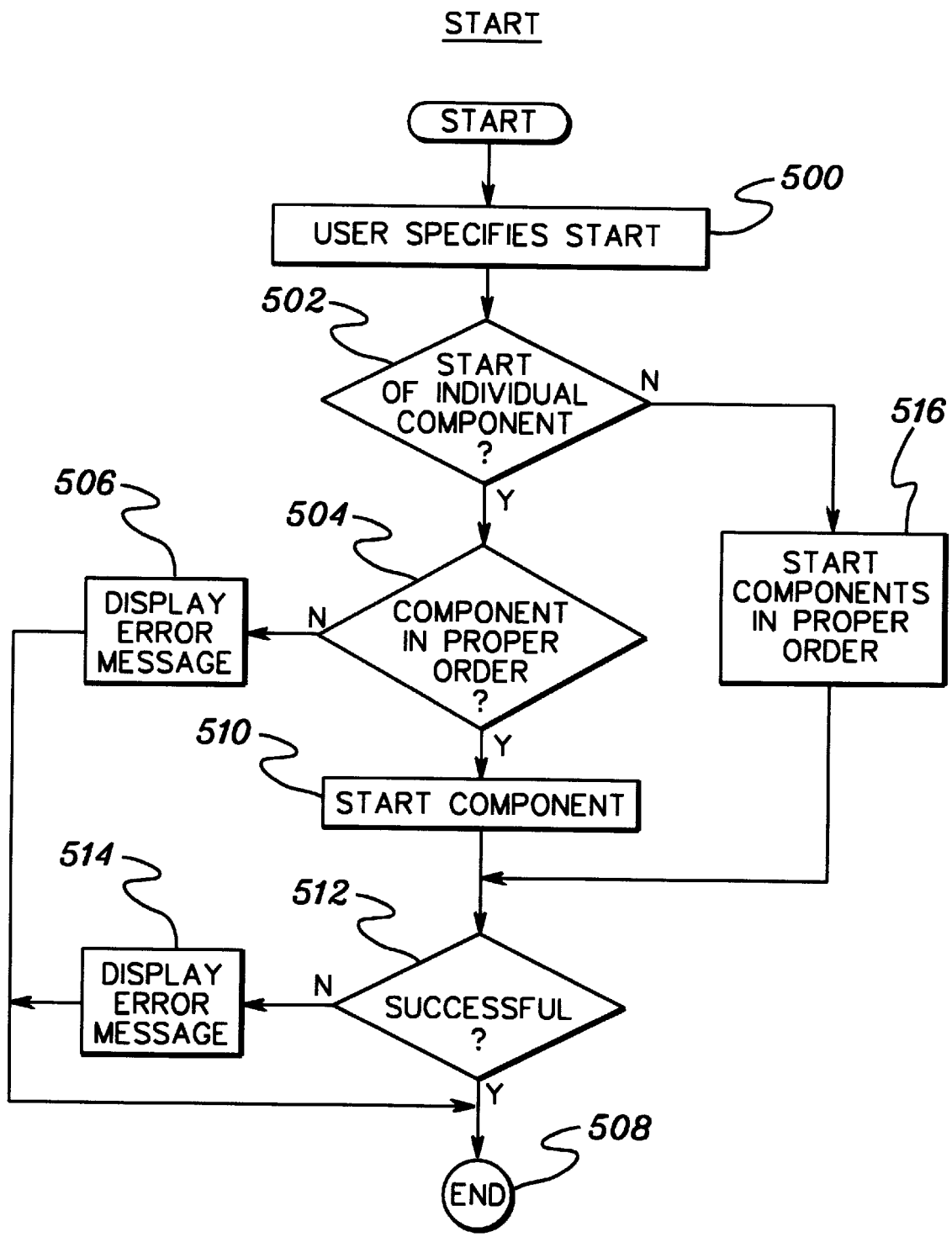
FIG. 5 depicts one embodiment of the logic associated with starting one or more components of a complex task, in accordance with the principles of the present invention.

Subsequent to creating the objects and the real-world instances of the objects, the user can specify a start of an individual component or of the entire complex task, STEP 500 (FIG. 5). In one example, this specification is made via a graphical user interface. For instance, in order to start a single component, the user pulls down the Actions option, which will prompt the user for the id of the component to be started. In order to start the entire complex task, the user selects the Start Configuration icon within the Tool Bar, which automatically goes through the start procedure for the complex task currently being worked on.

If an individual component is to be started, then a determination is made as to whether the component is being started in the proper order, INQUIRY 504. In particular, pipes are to be started before links and applications, and links are to be started before applications. Further, a precondition may be placed on an object that mandates that the object cannot be started until one or more other objects have completed. Thus, when a component of a complex task is to be started, a check is made to determine that the other components that are to be started first are indeed started, and that any components that need to complete have completed. This check is accomplished by viewing the state field of the objects.

Should the component be out of order, then an error message is displayed, STEP 506, and processing of the start procedure is complete, STEP 508. At this point, the user has the opportunity to specify another component that needs to be started first and the process continues, as described above. (In another embodiment, subsequent to displaying the error message, processing does not end, but, instead, continues with STEP 510, "START COMPONENT," which is described below.)

If, on the other hand, the component is being started in the proper order, then the component is started, STEP 510. For example, if the component is an application, then the real-world instance of the application object is run. That is, the application is started. Similarly, if the component is a pipe or a link, then the real-world instance of that component is started.

In one example, the application programming interface described above can be used to start the component. In particular, the complex task management capability of the present invention, provides a function call to the interface supplying the appropriate parameters to start the real-world instance. In one example, the parameters include the name (i.e., the handle) of the real-world instance previously created. This handle was supplied by the interface, when the real-world instance was created.

Subsequent to starting the component, a determination is made as to whether the start was successful, INQUIRY 512. If it was successful, as determined by its state in the object, then processing of the start command is complete, STEP 508. However, if the start was unsuccessful, then an error message is displayed, STEP 514, and the start process ends, STEP 508.

Returning to INQUIRY 502, if the user specified a start of the entire complex task, then the components are automatically started in the proper order, STEP 516. In particular, the order is programmatically determined, such that pipes are started first, and then the links and then the applications. By programming this order, the user is relieved from the responsibility of knowing which components are to be started first, and errors are less likely to occur.

If the starting of the components is successful, INQUIRY 512, then the start process is complete, STEP 508. Otherwise, an error message is displayed, as described above, STEP 514.

Figure 6:
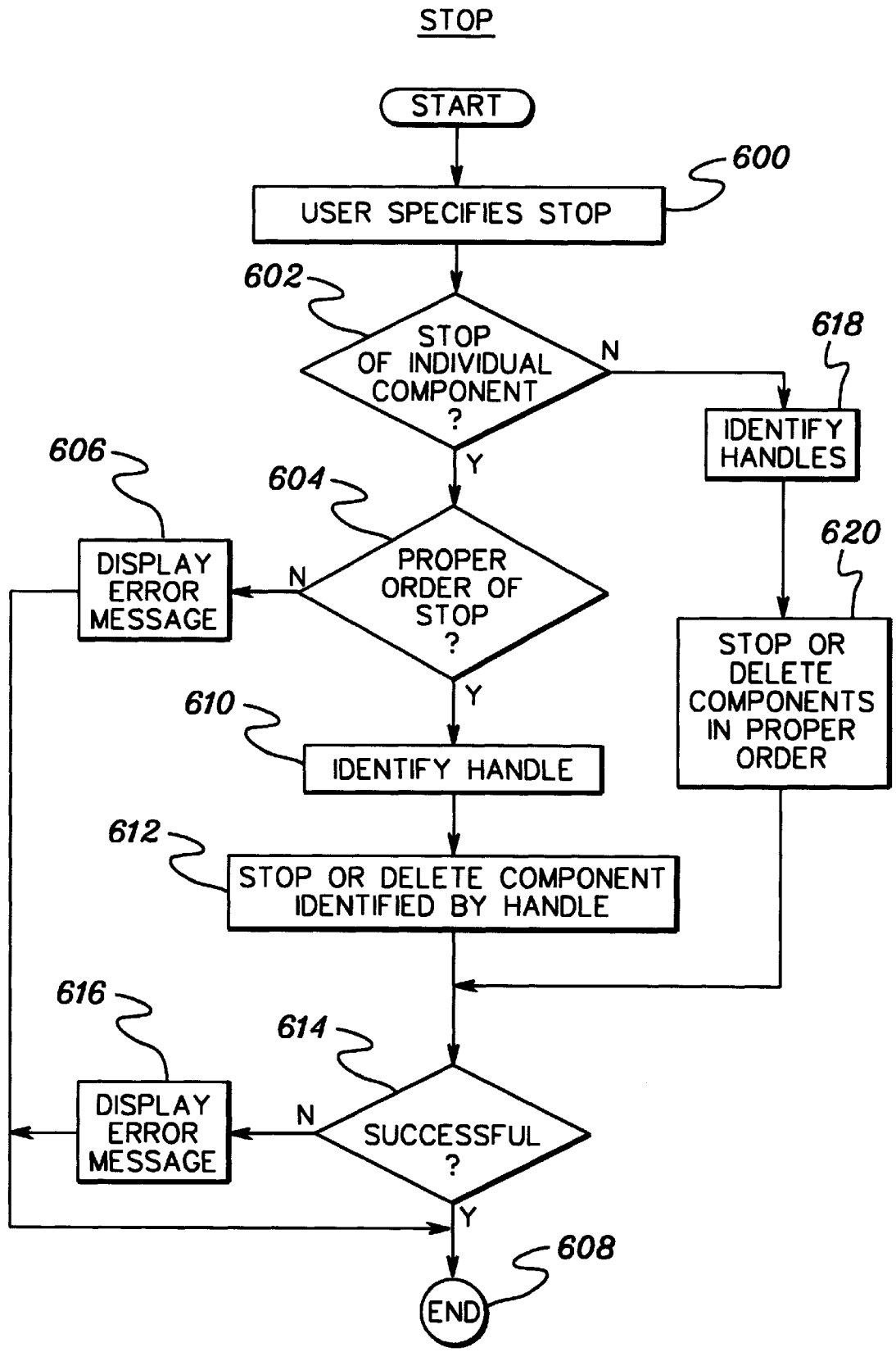
FIG. 6 depicts one embodiment of the logic associated with stopping one or more components of a complex task, in accordance with the principles of the present invention.

In addition to managing the creation and starting of components, the complex task management capability of the present invention can also control the stopping of one or more components of a complex task. One embodiment for stopping one or more components of a complex task is described in detail with reference to FIG. 6.

A user can specify that one or more components of a complex task is to be stopped via, for instance, the graphical user interface, STEP 600. For example, if the user wishes to stop a particular component, the user pulls down the Actions option on the graphical user interface and supplies the id of the component to be stopped, at the appropriately prompted location. If the user wishes to stop the entire complex task, the user selects the Stop Configuration icon of the Tool Bar, which will prompt the stopping of the complex task.

If the user indicates that an individual component is to be stopped, INQUIRY 602, then a determination is made as to whether the stopping of this component would be in the proper order, INQUIRY 604. In particular, there is a proper order for the objects that has been programmatically created. In one example, the proper order for stopping objects is applications first, then links and then pipes. Thus, a determination is made as to whether the stopping of this particular object would leave other objects started that should not be. For instance, if the user wishes to stop a pipe, then a check is made to ensure that any applications and links connected to the pipe are already stopped. This determination is made by checking the state of each of the objects.

If an attempt is made to stop a component out of order, then an error message is displayed, STEP 606, and processing of the stop procedure is complete, STEP 608. At this point, the user can go back and attempt to stop the components in the correct order.

However, if the component is in the proper order for stopping, then the handle for the object is obtained from the ID field of the object, STEP 610.

Thereafter, the real-world instance of the object, identified by the handle, is stopped or deleted, STEP 612. For example, if the instance is of an AIX application, then it is stopped by sending an AIX kill signal to the real-world instance of the application. If it is an MVS application, then a cancel command (via, e.g., TSO offered by International Business Machines Corporation) may be used to stop the application. Further, if the instance is of an AIX pipe, then the AIX remove (rm) command can be used to delete the pipe. If the instance is of an MVS pipe, then the TSO cancel command can also be used to delete the pipe. Additionally, if the instance is of a link, the link is stopped by stopping, for example, the two CLIO/S applications that essentially make up the link. (In one embodiment, the application programming interface described above can be used to stop or delete the real-world instance.)

The stopping or deleting of the real-world instances effectively stops or deletes the objects corresponding to those real-world instances. That is, the state of the object will reflect the stopped or deleted nature of the instance.

Subsequent to stopping or deleting the component, a determination is made as to whether the stop or delete was successful, INQUIRY 614. This determination may be made by checking the return code of the command performing the stop or delete of the real-world instance. When the stop or delete is successful, then the stopping process is complete, STEP 608. However, if an error occurred, then an error message is displayed, STEP 616, and processing ends, STEP 608.

Returning to INQUIRY 602, if the user indicates that the entire complex task is to be stopped, then each of the handles of the real-world instances are identified, STEP 618, and the instances corresponding to those handles are automatically stopped or deleted in the proper order, STEP 620. Again, the stopping or deleting of the real-world instances effectively stops or deletes the objects corresponding to those instances.

Thereafter, a determination is made as to whether the stop was successful for the task, INQUIRY 614. If it was successful, then processing is complete, STEP 608. If not, an error message is displayed, STEP 616, and then the process ends, STEP 608.

Figure 7:
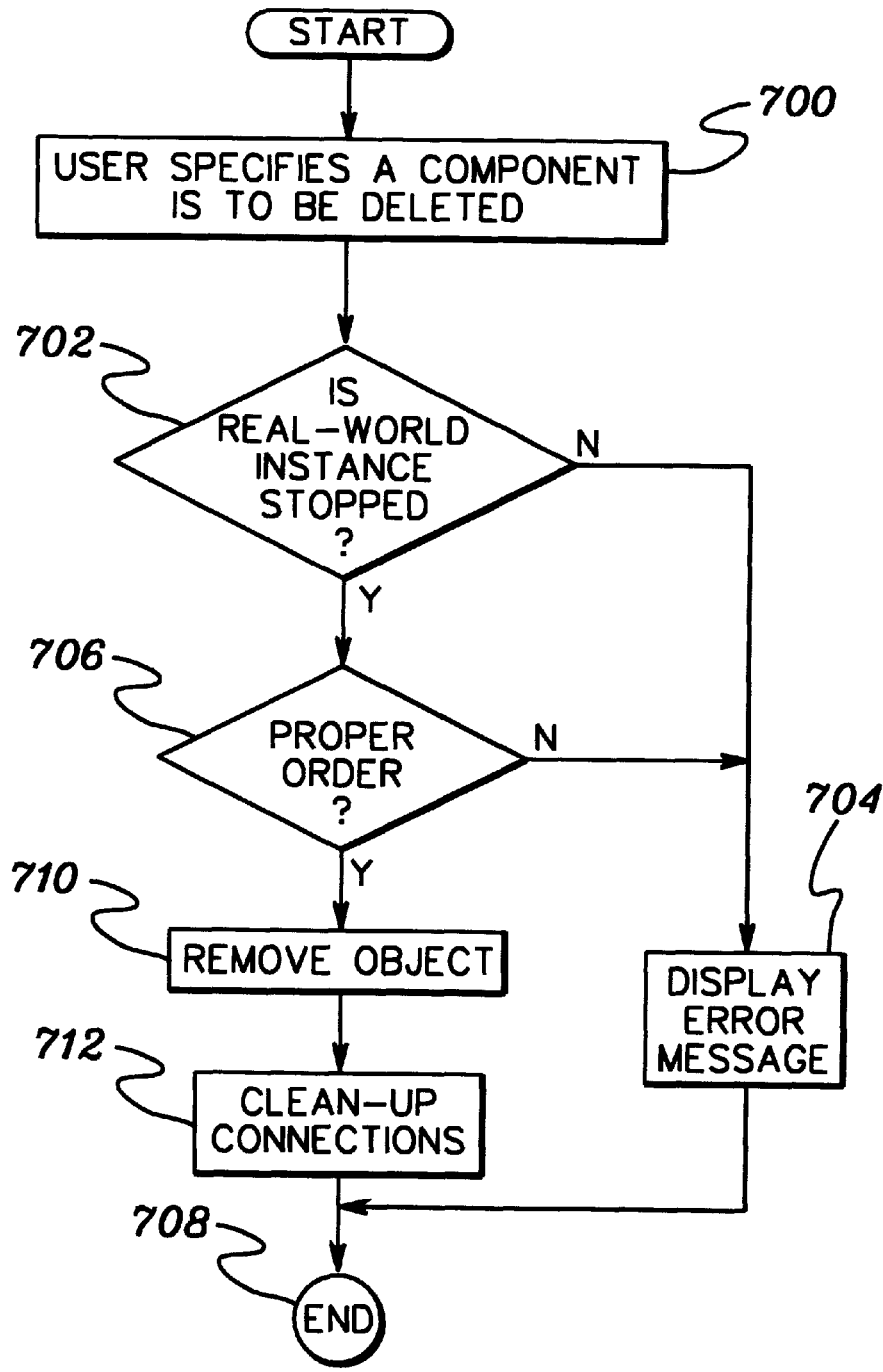
FIG. 7 depicts one embodiment of the logic associated with deleting a component of a complex task, in accordance with the principles of the present invention.

In addition to the above functions, a user may decide to delete a component of a complex task. The specification of delete, in this instance, causes the object to be removed, since the real-world instance has already been stopped. Thus, this function may be used to clean-up the objects, if necessary or desired. One embodiment for deleting a component is described in detail with reference to FIG. 7.

Initially, a user specifies a component is to be deleted by, for instance, selecting the delete icon on the graphical user interface, STEP 700. The user is then prompted for the id of the object to be deleted.

Subsequent to identifying a component to be deleted, a determination is made as to whether the real-world instance of the component has already been stopped, INQUIRY 702. This determination is made by, for example, checking whether the real-world instance is in existence. If the real-world instance is still available, then an error message is displayed, since the object corresponding to that real-world instance cannot be deleted, at this time, STEP 704. However, if the real-world instance is gone, then the delete process continues, as described below.

A determination is made as to whether this object is in proper order for deletion, INQUIRY 706. For example, the proper order for deletion, which has been programmatically defined, is applications first, then pipes and lastly, links. If this object is not in the proper order for deletion, then an error message is displayed, STEP 704, and the delete process ends, STEP 708.

If, on the other hand, the object is in proper order for deletion, then the object is removed, STEP 710. In one example, the object is removed using a C++ Remove command.

Subsequent to removing the object, connections associated with the removed object are automatically cleaned-up, in accordance with the principles of the present invention, STEP 712. For example, if an application that writes to a pipe is deleted, then the pipe object is updated to reflect the deletion. Specifically, the input to the pipe is set to null indicating that the pipe's input has been deleted. Thereafter, the delete process is complete, STEP 708.

Described in detail above are a number of functions used to control or manage a complex task, including creating, starting, stopping and deleting one or more components of the task. A complex task is also managed, however, by automatically collecting information regarding the data flow among the components, such that the collected information provides overall status of the complex task. That is, by collecting information, regarding the individual components, relatively close in time, the overall status of the complex task can be obtained. This status information can then be used to further control the components. For example, from this information, a decision may be made to stop, delete, or start one or more components of a complex task.

Figure 8:
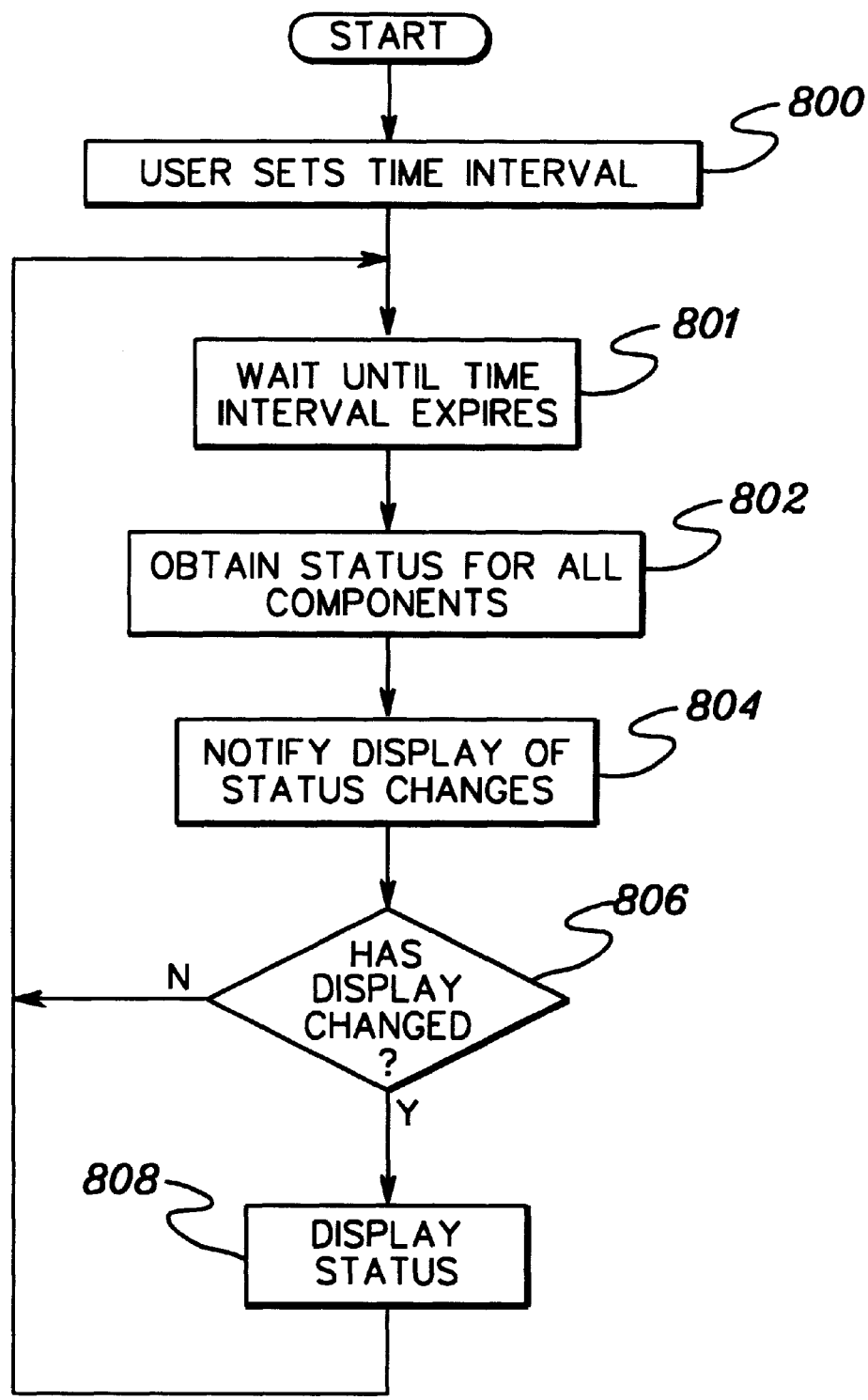
FIG. 8 depicts one embodiment of the logic associated with automatically collecting status information for a complex task, in accordance with the principles of the present invention.

One embodiment for automatically collecting information is described in detail with reference to FIG. 8. Initially, a user sets a time interval indicating how often and when the status information is to be collected, STEP 800. In one example, this time interval is set via the graphical user interface. In particular, the user pulls down the Options icon on the graphical user interface and fills in the desired time interval, where prompted. (In another embodiment, a default value is used for the time interval.)

Then, the inputted time interval is provided to the complex task management capability of the present invention, which includes a timer loop (e.g., written in C++). On each pass through the loop, the duration of which is based on the user input, STEP 801, status of all of the components of the complex task is obtained, STEP 802. For example, for each component, the following information is obtained:

(a) The state of the real-world instance is obtained in a known manner. For example, an application keeps track of its own state, which can then be requested.

(b) The number of bytes transferred is obtained from, for instance, the link. The link keeps track of the amount of data transferred across the link.

(c) he instantaneous speed is derived by dividing the number of bytes transferred by the user specified interval time. This reflects how many bytes were transferred during the last interval sample.

(d) The quiescent time indicates how long since a component has been active. For instance, for an application, this would be determined by checking the CPU time. If the CPU time has been the same for the last 3 seconds, as one example, then the quiescent time is 3 seconds.

(e) The time since started indicates how long a component has been running. Again, this is obtained in a known manner.

In one embodiment, at least some of the above information may be obtained using the application programming interface described above. However, the interface is not necessary.

After obtaining the updated status information, various fields of each object, such as state, bytesTransferred and quiescentTime are updated. This causes the object to notify the display of the status changes, STEP 804.

Thereafter, a determination is made as to whether the display is changed based on the updated status, INQUIRY 806. If so, the status is displayed via, for example, the GUI, STEP 808. Thereafter, or if the display has not changed, then processing continues with STEP 801.

The complex task management capability of the present invention, and in particular, the graphical user interface, provides a centralized message and status handler for the components of a complex task. It allows a user to easily display messages, status information, and return codes gathered for each specific component. Information regarding the components is brought back to a central place for easy monitoring and for control. That is, if a user determines that a task is not running efficiently or if a component has an error, the user can provide control by specifying an appropriate command, such as start, stop and/or delete, to remedy the situation. This control can be from the central location of the graphical user interface.

Figure 9:
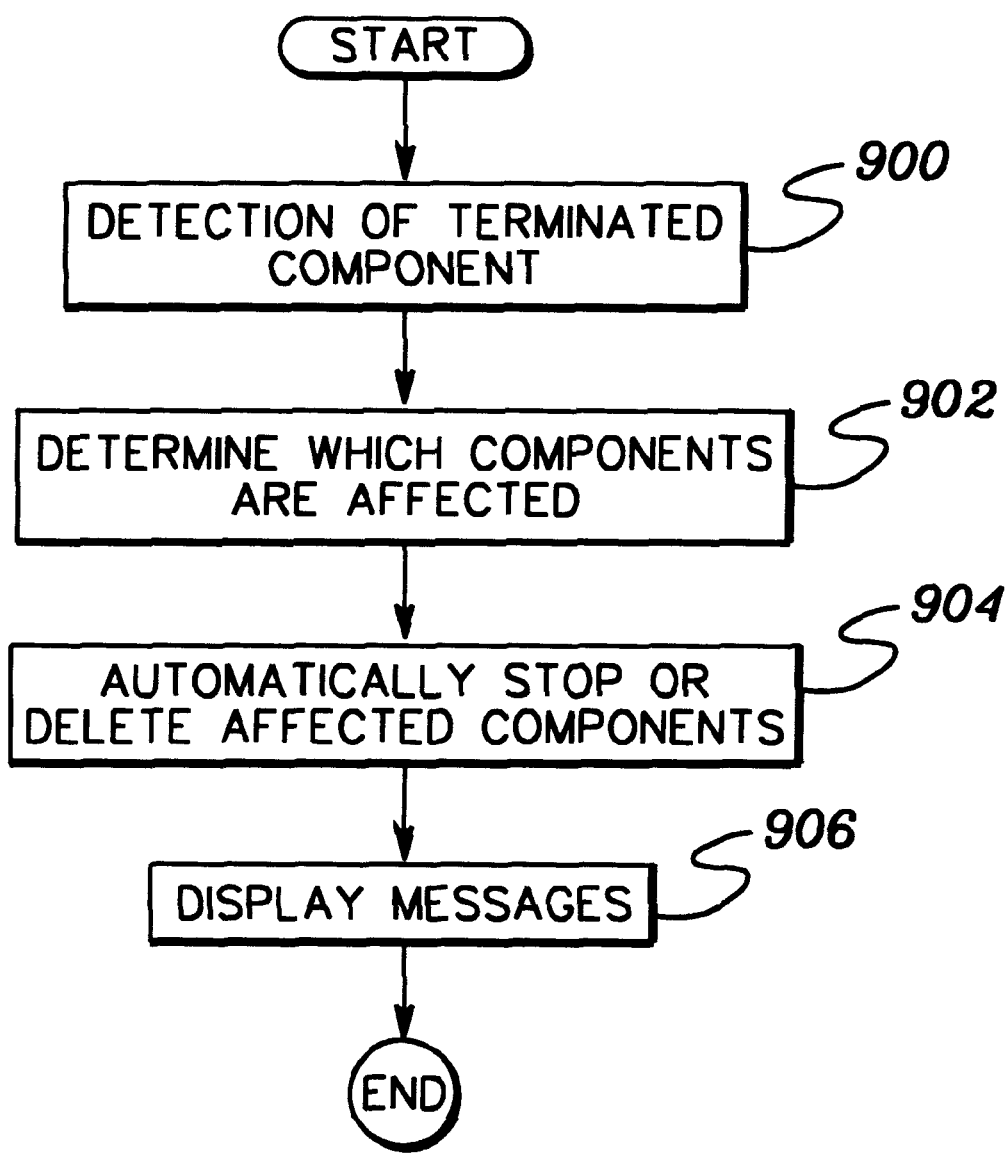
FIG. 9 depicts one embodiment of the logic associated with post-run automated recovery, in accordance with the principles of the present invention.

In addition to the above, the complex task management capability of the present invention provides for post-run automated recovery. For instance, when a terminated component is detected, one or more other components associated with the terminated component are automatically stopped or deleted. One embodiment of post-run automated recovery is described in detail with reference to FIG. 9.

Initially, the complex task management capability of the present invention detects that a component of a complex task has terminated, either successfully or abnormally, STEP 900. One way in which such a detection is made is by checking the state of the object corresponding to the component. The state indicates the current status of the object.

When a terminated component is detected, a determination is made as to which other components of the complex task can be automatically stopped or deleted, since they are no longer needed, STEP 902. This determination is made by, for instance, looking at the input(s)/output(s) of the terminated component. For example, if an application has terminated and an output of the application is a pipe, then the pipe can be deleted, since it is no longer needed.

Subsequent to determining which, if any, other components can be stopped or deleted, those components are automatically stopped or deleted, STEP 904. For instance, in the above example, the pipe is deleted.

Thereafter, messages regarding the post-run automated recovery are displayed via, for instance, the graphical user interface, STEP 906. For example, the user is notified of the terminated component, as well as, the affected components that have been terminated.

In some cases, even though a component has been terminated, other components may not be capable of being stopped or deleted at that particular time. For example, if a pipe has been deleted and a link is coupled to the pipe, the link may not be deleted until the pipe on the other end of the link is also deleted. This logic is incorporated in the post-run automated recovery process of the complex task management capability of the present invention.

One example of the complex task management capability of the present invention being utilized in a task of splitting a DB2/MVS database and loading it to various nodes on the RS/6000 SP is described below with reference to FIG. 10.

Figure 10:
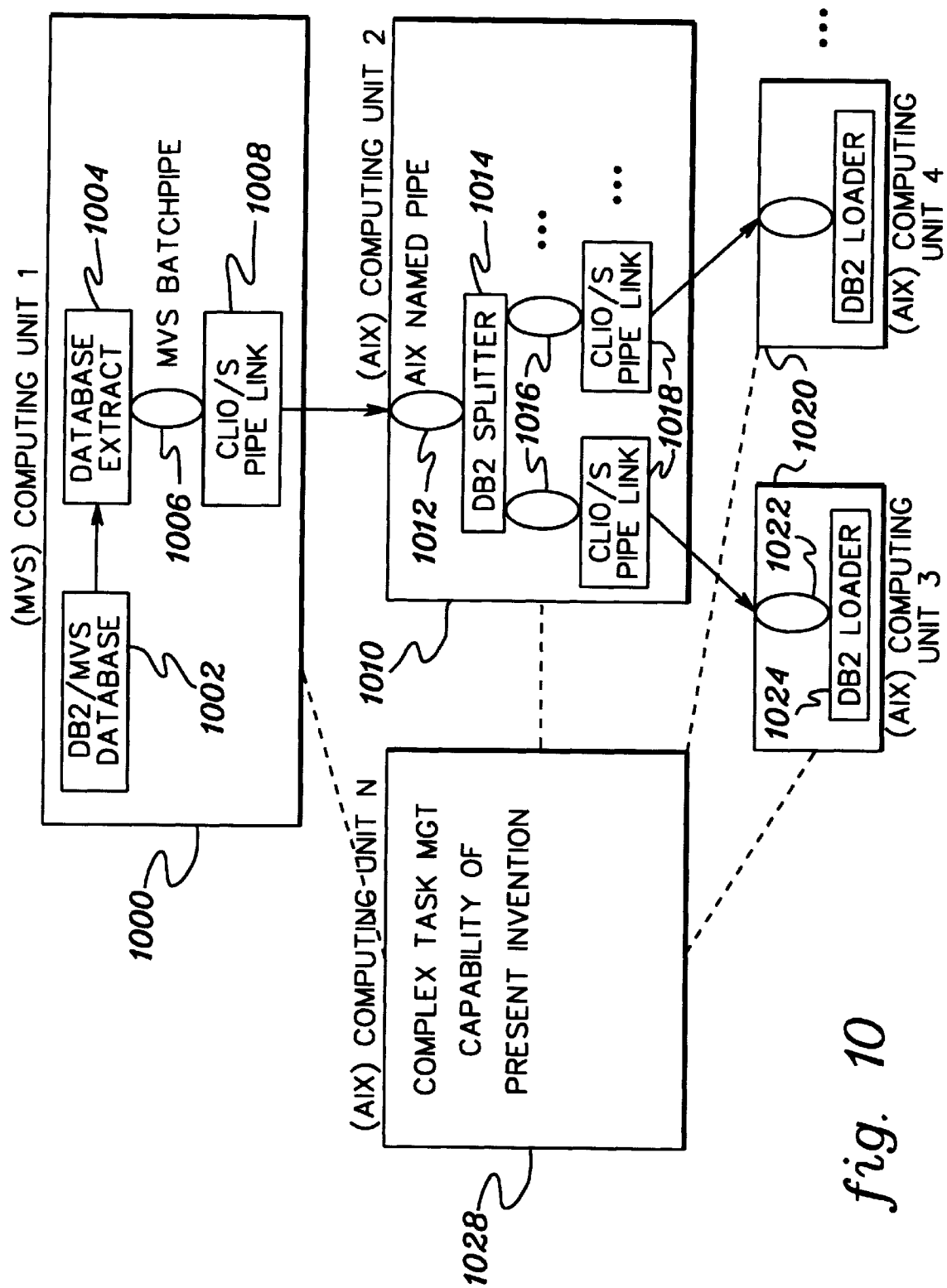
FIG. 10 depicts one example of a complex task managed in accordance with the principles of the present invention.

As shown in FIG. 10, one computing node 1000, running the MVS operating system, includes a data source 1002, which is a DB2 database stored on tape, as one example; an MVS application 1004, referred to as Database Extract, which reads the tape to retrieve the data from the database, and writes the data out as raw data fields; an MVS BatchPipe 1006, which is output to application 1004 and input to a CLIO/S pipe link 1008. Link 1008 connects the MVS computing unit with another computing unit 1010, which is running AIX.

Computing unit 1010 includes, for instance, an AIX named pipe 1012, which receives data output from link 1008 and is input to an AIX application 1014, referred to as DB2 Splitter. Application 1014 takes the data received from pipe 1012 and writes it to a plurality of AIX pipes 1016 (e.g., 32 pipes). Each of pipes 1016 is input to a separate CLIO/S pipe link 1018, which is coupled to another AIX computing unit 1020.

Each computing unit 1020 includes another AIX pipe 1022, which is input to another AIX application 1024 named DB2 Loader. It is the loader program that will load the database on the various SP units.

In addition to the above, the complex task management capability of the present invention is located on another AIX computing unit 1028, which is coupled to each of the other computing units. The management of the complex task (e.g., the splitting of the DB2/MVS database and loading it to various nodes on the RS/6000 SP) is controlled from computing unit 1028. Thus, computing unit 1028 is considered the local unit and the other units are considered remote units. (In another embodiment, the complex task is not located on a separate computing unit, but included on one or more of the other computing units.)

The task management capability creates the objects for the components of the splitting/loading complex task and manages those objects by offering pre-run validation, automatically determining the proper order for starting, stopping and/or deleting one or more components of the task, automatically collecting status information in order to understand and manage the overall complex task, and offering post-run automated recovery, as described above.

As described in detail above, a complex task management capability that enables overall status of a complex task to be obtained is provided. In particular, a data source to data consumer view is obtained, rather than an individual component view. The status information is automatically collected close in time such that there is a substantially simultaneous view of all the components.

Through the centralized control of the present invention, management complexities are decreased and errors are detected through validation performed before starting the complex task. Configuration errors can be surfaced at create time as opposed to run time. Additionally, data flow directions and data connections can be verified before running the complex task. Furthermore, a centralized message and status handler for all the configured components is provided, which allows the user to easily display messages, status information, and return codes gathered for each components.

In addition to the above, the complex task management capability of the present invention automatically provides run sequencing in that specific components are started before other components. Further, a start-after function is provided so that the user can indicate that a specific application is to start after another application has run to completion.

Additionally, the complex task management capability of the present invention provides for post-run automated recovery that automatically stops or deletes components corresponding to a terminated component.

The complex task management capability of the present invention does not require code changes in the user applications, the addition of hooks into the user applications, or the recompilation of the user applications.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing complex tasks of a computer environment, said method comprising:
   specifying a complex task to be executed, said complex task comprising a plurality of independent, cooperating components; and
   controlling said plurality of independent, cooperating components to manage said complex task, said controlling comprising at least one of:
      dynamically validating at least one component of said plurality of independent, cooperating components prior to execution of said complex task;
      programmatically determining a proper order for performing one of a start, stop, and delete of one or more components of said plurality of independent, cooperating components;
      automatically recovering from a terminated component of said plurality of independent, cooperating components, said automatically recovering comprising automatically determining which, if any, of said plurality of independent, cooperating components are affected by said terminated component and managing those components that are affected; and
      automatically collecting, at more than one instance, information from at least two of said plurality of independent, cooperating components regarding data flow among said plurality of independent, cooperating components, wherein said automatically collected information provides status of said complex task.

2. The method of claim 1, wherein said specifying comprises defining one or more of said plurality of independent, cooperating components using a graphical user interface.

3. The method of claim 1, wherein said dynamically validating comprises at least one of the following:
   verifying an input of said at least one component;
   verifying one or more data flow directions for said at least one component; and
   verifying one or more data connections for said at least one component.

4. The method of claim 1, further comprising creating at least one program representation for said at least one component to be dynamically validated, and wherein said dynamically validating comprises at least one of the following:
   verifying an input of said at least one program representation;
   verifying one or more data flow directions for said at least one program representation; and
   verifying one or more data connections for said at least one program representation.

5. The method of claim 4, wherein said program representation is an object.

6. The method of claim 1, wherein said dynamically validating is performed on said plurality of independent, cooperating components.

7. The method of claim 1, wherein said programmatically determining a proper order for performing a start comprises indicating that certain types of components of said complex task are to be started prior to other types.

8. The method of claim 7, wherein said plurality of independent, cooperating components of said complex task includes at least one application, at least one pipe and at least one link, and wherein said indicating comprises indicating that said at least one pipe is to be started prior to said at least one link and said at least one application, and that said at least one link is to be started prior to said at least one application.

9. The method of claim 7, wherein said programmatically determining a proper order for performing a start further comprises determining whether one or more of said plurality of independent, cooperating components is to be completed prior to starting one or more other components of said plurality of independent, cooperating components.

10. The method of claim 1, wherein said programmatically determining a proper order for performing a stop comprises indicating that certain types of components of said complex task are to be stopped prior to other types.

11. The method of claim 10, wherein said plurality of independent, cooperating components of said complex task includes at least one application, at least one pipe and at least one link, and wherein said indicating comprises indicating that said at least one application is to be stopped prior to said at least one link and said at least one pipe, and that said at least one link is to be stopped prior to said at least one pipe.

12. The method of claim 1, wherein said programmatically determining a proper order for performing a delete comprises indicating that certain types of components of said complex task are to be deleted prior to other types.

13. The method of claim 12, wherein said plurality of independent, cooperating components of said complex task includes at least one application, at least one pipe and at least one link, and wherein said indicating comprises indicating that said at least one application is to be deleted prior to said at least one link and said at least one pipe, and that said at least one pipe is to be deleted prior to said at least one link.

14. The method of claim 1, wherein said determining which, if any, of said plurality of independent, cooperating components are affected by said terminated component comprises determining one or more outputs of said terminated component, wherein said one or more outputs indicates said affected components.

15. The method of claim 1, wherein said managing those components that are affected comprises one of stopping and deleting said affected components.

16. The method of claim 1, wherein said automatically collecting comprises obtaining, substantially simultaneously, information regarding said plurality of independent, cooperating components.

17. The method of claim 16, wherein said obtaining is performed during one or more predefined time intervals.

18. The method of claim 1, wherein said automatically collecting comprises providing said automatically collected information to a centralized status handler.

19. The method of claim 18, wherein said centralized status handler comprises a graphical user interface.

20. The method of claim 1, wherein said plurality of independent, cooperating components are distributed across a plurality of computing units.

21. A method of managing complex tasks of a computer environment, said method comprising:

specifying a complex task to be executed, said complex task comprising a plurality of independent, cooperating components; and automatically collecting, at more than one instance, information from at least two of said plurality of independent, cooperating components regarding data flow among said plurality of independent, cooperating components, wherein said automatically collected information provides status of said complex task.

22. The method of claim 21, wherein said automatically collecting comprises obtaining, substantially simultaneously, information regarding said plurality of independent, cooperating components.

23. The method of claim 22, wherein said obtaining is performed during one or more predefined time intervals.

24. The method of claim 21, further comprising using said automatically collected information to control one or more of said plurality of independent, cooperating components.

25. The method of claim 24, wherein said control includes at least one of:

determining to stop one or more of said plurality of independent, cooperating components;

determining to delete one or more of said plurality of independent, cooperating components; and determining to start one or more of said plurality of independent, cooperating components.

26. The method of claim 25, further comprising removing one or more program representations corresponding to said one or more of said plurality of independent, cooperating components, when a deletion determination is made.

27. The method of claim 26, further comprising cleaning up one or more connections of said one or more program representations, when said one or more program representations is removed.

28. The method of claim 25, further comprising determining a proper order for deleting said one or more of said plurality of independent, cooperating components, when a deletion determination is made.

29. The method of claim 25, further comprising determining a proper order for stopping said one or more of said plurality of independent, cooperating components, when a stop determination is made.

30. The method of claim 25, further comprising determining a proper order for starting said one or more of said plurality of independent, cooperating components, when a start determination is made.

31. The method of claim 21, wherein said specifying comprises:

identifying said plurality of independent, cooperating components;

creating program representations for said plurality of independent, cooperating components; and dynamically validating at least one of said program representations prior to starting said complex task.

32. The method of claim 21, wherein said specifying and said automatically collecting are performable via a centralized control.

33. A system of managing complex tasks of a computer environment, said system comprising:

means for specifying a complex task to be executed, said complex task comprising a plurality of independent, cooperating components; and means for controlling said plurality of independent, cooperating components to manage said complex task, said means for controlling comprising at least one of:

means for dynamically validating at least one component of said plurality of independent, cooperating components prior to execution of said complex task;

means for programmatically determining a proper order for performing one of a start, stop, and delete of one or more components of said plurality of independent, cooperating components;

means for automatically recovering from a terminated component of said plurality of independent, cooperating components, said means for automatically recovering comprising means for automatically determining which, if any, of said plurality of independent, cooperating components are affected by said terminated component and means for managing those components that are affected; and means for automatically collecting, at more than one instance, information from at least two of said plurality of independent, cooperating components regarding data flow among said plurality of independent, cooperating components, wherein said automatically collected information provides status of said complex task.

34. The system of claim 33, wherein said means for specifying comprises using a graphical user interface to define one or more of said plurality of independent, cooperating components.

35. The system of claim 33, wherein said means for dynamically validating comprises at least one of the following:

means for verifying an input of said at least one component;

means for verifying one or more data flow directions for said at least one component; and means for verifying one or more data connections for said at least one component.

36. The system of claim 33, wherein said means for programmatically determining a proper order for performing a start comprises means for indicating that certain types of components of said complex task are to be started prior to other types.

37. The system of claim 36, wherein said plurality of independent, cooperating components of said complex task includes at least one application, at least one pipe and at least one link, and wherein said means for indicating comprises means for indicating that said at least one pipe is to be started prior to said at least one link and said at least one application, and that said at least one link is to be started prior to said at least one application.

38. The system of claim 36, wherein said means for programmatically determining a proper order for performing a start further comprises means for determining whether one or more of said plurality of independent, cooperating components is to be completed prior to starting one or more other components of said plurality of independent, cooperating components.

39. The system of claim 33, wherein said means for programmatically determining a proper order for performing a stop comprises means for indicating that certain types of components of said complex task are to be stopped prior to other types.

40. The system of claim 39, wherein said plurality of independent, cooperating components of said complex task includes at least one application, at least one pipe and at least one link, and wherein said means for indicating comprises means for indicating that said at least one application is to be stopped prior to said at least one link and said at least one pipe, and that said at least one link is to be stopped prior to said at least one pipe.

41. The system of claim 33, wherein said means for programmatically determining a proper order for performing a delete comprises means for indicating that certain types of components of said complex task are to be deleted prior to other types.

42. The system of claim 41, wherein said plurality of independent, cooperating components of said complex task includes at least one application, at least one pipe and at least one link, and wherein said means for indicating comprises means for indicating that said at least one application is to be deleted prior to said at least one link and said at least one pipe, and that said at least one pipe is to be deleted prior to said at least one link.

43. The system of claim 33, wherein said means for determining which, if any, of said plurality of independent, cooperating components are affected by said terminated component comprises means for determining one or more outputs of said terminated component, wherein said one or more outputs indicates said affected components.

44. The system of claim 33, wherein said means for managing those components that are affected comprises one of stopping and deleting said affected components.

45. The system of claim 33, wherein said means for automatically collecting comprises means for obtaining, substantially simultaneously, information regarding said plurality of independent, cooperating components.

46. The system of claim 45, wherein said means for obtaining is performed during one or more predefined time intervals.

47. The system of claim 33, wherein said means for automatically collecting comprises means for providing said automatically collected information to a centralized status handler.

48. A system of managing complex tasks of a computer environment, said system comprising:

means for specifying a complex task to be executed, said complex task comprising a plurality of independent, cooperating components; and means for automatically collecting, at more than one instance, information from at least two of said plurality of independent, cooperating components regarding data flow among said plurality of independent, cooperating components, wherein said automatically collected information provides status of said complex task.

49. The system of claim 48, wherein said means for automatically collecting comprises means for obtaining, substantially simultaneously, information regarding said plurality of independent, cooperating components.

50. The system of claim 48, further comprising means for using said automatically collected information to control one or more of said plurality of independent, cooperating components.

51. The system of claim 50, wherein said control includes at least one of:

determining to stop one or more of said plurality of independent, cooperating components;

determining to delete one or more of said plurality of independent, cooperating components; and determining to start one or more of said plurality of independent, cooperating components.

52. The system of claim 51, further comprising means for removing one or more program representations corresponding to said one or more of said plurality of independent, cooperating components, when a deletion determination is made.

53. The system of claim 52, further comprising means for cleaning up one or more connections of said one or more program representations, when said one or more program representations is removed.

54. The system of claim 51, further comprising means for determining a proper order for deleting said one or more of said plurality of independent, cooperating components, when a deletion determination is made.

55. The system of claim 51, further comprising means for determining a proper order for stopping said one or more of said plurality of independent, cooperating components, when a stop determination is made.

56. The system of claim 51, further comprising means for determining a proper order for starting said one or more of said plurality of independent, cooperating components, when a start determination is made.

57. The system of claim 48, wherein said means for specifying comprises:

means for identifying said plurality of independent, cooperating components;

means for creating program representations for said plurality of independent, cooperating components; and means for dynamically validating at least one of said program representations prior to starting said complex task.

58. A system of managing complex tasks of a computer environment, said system comprising:

at least one computing unit adapted to specify a complex task to be executed, said complex task comprising a plurality of independent, cooperating components; and at least one computing unit adapted to control said plurality of independent, cooperating components to manage said complex task, said control comprising at least one of:

dynamically validating at least one component of said plurality of independent, cooperating components prior to execution of said complex task;

programmatically determining a proper order for performing one of a start, stop, and delete of one or more components of said plurality of independent, cooperating components;

automatically recovering from a terminated component of said plurality of independent, cooperating components, said automatically recovering comprising automatically determining which, if any, of said plurality of independent, cooperating components are affected by said terminated component and managing those components that are affected; and automatically collecting, at more than one instance, information from at least two of said plurality of independent, cooperating components regarding data flow among said plurality of independent, cooperating components, wherein said automatically collected information provides status of said complex task.

59. An article of manufacture comprising:

at least one computer useable medium having computer readable program code means embodied therein for causing the managing of complex tasks of a computer environment, the computer readable program code means in said article of manufacture comprising:

computer readable program code means for causing a computing unit to effect specifying a complex task to be executed, said complex task comprising a plurality of independent, cooperating components; and computer readable program code means for causing a computing unit to effect controlling said plurality of independent, cooperating components to manage said complex task, said computer readable program code means for causing a computing unit to effect controlling comprising at least one of:

computer readable program code means for causing a computing unit to effect dynamically validating at least one component of said plurality of independent, cooperating components prior to execution of said complex task;

computer readable program code means for causing a computing unit to effect programmatically determining a proper order for performing one of a start, stop, and delete of one or more components of said plurality of independent, cooperating components;

computer readable program code means for causing a computing unit to effect automatically recovering from a terminated component of said plurality of independent, cooperating components, said automatically recovering comprising automatically determining which, if any, of said plurality of independent, cooperating components are affected by said terminated component and managing those components that are affected; and computer readable program code means for causing a computing unit to effect automatically collecting, at more than one instance, information from at least two of said plurality of independent, cooperating components regarding data flow among said plurality of independent, cooperating components, wherein said automatically collected information provides status of said complex task.

60. The article of manufacture of claim 59, wherein said computer readable program code means for causing a computing unit to effect dynamically validating comprises at least one of the following:

computer readable program code means for causing a computing unit to effect verifying an input of said at least one component;

computer readable program code means for causing a computing unit to effect verifying one or more data flow directions for said at least one component; and computer readable program code means for causing a computing unit to effect verifying one or more data connections for said at least one component.

61. The article of manufacture of claim 59, wherein said computer readable program code means for causing a computing unit to effect programmatically determining a proper order for performing a start comprises computer readable program code means for causing a computing unit to effect indicating that certain types of components of said complex task are to be started prior to other types.

62. The article of manufacture of claim 61, wherein said plurality of independent, cooperating components of said complex task includes at least one application, at least one pipe and at least one link, and wherein said computer readable program code means for causing a computing unit to effect indicating comprises computer readable program code means for causing a computing unit to effect indicating that said at least one pipe is to be started prior to said at least one link and said at least one application, and that said at least one link is to be started prior to said at least one application.

63. The article of manufacture of claim 61, wherein said computer readable program code means for causing a computing unit to effect programmatically determining a proper order for performing a start further comprises computer readable program code means for causing a computing unit to effect determining whether one or more of said plurality of independent, cooperating components is to be completed prior to starting one or more other components of said plurality of independent, cooperating components.

64. The article of manufacture of claim 59, wherein said computer readable program code means for causing a computing unit to effect programmatically determining a proper order for performing a stop comprises computer readable program code means for causing a computing unit to effect indicating that certain types of components of said complex task are to be stopped prior to other types.

65. The article of manufacture of claim 64, wherein said plurality of independent, cooperating components of said complex task includes at least one application, at least one pipe and at least one link, and wherein said computer readable program code means for causing a computing unit to effect indicating comprises computer readable program code means for causing a computing unit to effect indicating that said at least one application is to be stopped prior to said at least one link and said at least one pipe, and that said at least one link is to be stopped prior to said at least one pipe.

66. The article of manufacture of claim 59, wherein said computer readable program code means for causing a computing unit to effect programmatically determining a proper order for performing a delete comprises computer readable program code means for causing a computing unit to effect indicating that certain types of components of said complex task are to be deleted prior to other types.

67. The article of manufacture of claim 66, wherein said plurality of independent, cooperating components of said complex task includes at least one application, at least one pipe and at least one link, and wherein said computer readable program code means for causing a computing unit to effect indicating comprises computer readable program code means for causing a computing unit to effect indicating that said at least one application is to be deleted prior to said at least one link and said at least one pipe, and that said at least one pipe is to be deleted prior to said at least one link.

68. The article of manufacture of claim 59, wherein said computer readable program code means for causing a computing unit to effect automatically collecting comprises computer readable program code means for causing a computing unit to effect obtaining, substantially simultaneously, information regarding said plurality of independent, cooperating components.

69. An article of manufacture comprising:
at least one computer useable medium having computer readable program code means embodied therein for causing the managing of complex tasks of a computer environment, the computer readable program code means in said article of manufacture comprising:
computer readable program code means for causing a computing unit to effect specifying a complex task to be executed, said complex task comprising a plurality of independent, cooperating components; and
computer readable program code means for causing a computing unit to effect automatically collecting, at more than one instance, information from at least two of said plurality of independent, cooperating components regarding data flow among said plurality of independent, cooperating components, wherein said automatically collected information provides status of said complex task.

70. The article of manufacture of claim 69, wherein said computer readable program code means for causing a computing unit to effect automatically collecting comprises computer readable program code means for causing a computing unit to effect obtaining, substantially simultaneously, information regarding said plurality of independent, cooperating components.

71. The article of manufacture of claim 69, further comprising computer readable program code means for causing a computing unit to effect using said automatically collected information to control one or more of said plurality of independent, cooperating components.

72. The article of manufacture of claim 71, wherein said control includes at least one of:
computer readable program code means for causing a computing unit to effect determining to stop one or more of said plurality of independent, cooperating components;
computer readable program code means for causing a computing unit to effect determining to delete one or more of said plurality of independent, cooperating components; and
computer readable program code means for causing a computing unit to effect determining to start one or more of said plurality of independent, cooperating components.

73. The article of manufacture of claim 72, further comprising computer readable program code means for causing a computing unit to effect removing one or more program representations corresponding to said one or more of said plurality of independent, cooperating components, when a deletion determination is made.

74. The article of manufacture of claim 73, further comprising computer readable program code means for causing a computing unit to effect cleaning up one or more connections of said one or more program representations, when said one or more program representations is removed.

75. The article of manufacture of claim 72, further comprising computer readable program code means for causing a computing unit to effect determining a proper order for deleting said one or more of said plurality of independent, cooperating components, when a deletion determination is made.

76. The article of manufacture of claim 72, further comprising computer readable program code means for causing a computing unit to effect determining a proper order for stopping said one or more of said plurality of independent, cooperating components, when a stop determination is made.

77. The article of manufacture of claim 72, further comprising computer readable program code means for causing a computing unit to effect determining a proper order for starting said one or more of said plurality of independent, cooperating components, when a start determination is made.

78. The article of manufacture of claim 69, wherein said computer readable program code means for causing a computing unit to effect specifying comprises:
computer readable program code means for causing a computing unit to effect identifying said plurality of independent, cooperating components;
computer readable program code means for causing a computing unit to effect creating program representations for said plurality of independent, cooperating components; and
computer readable program code means for causing a computing unit to effect dynamically validating at least one of said program representations prior to starting said complex task.

79. A method of managing complex tasks of a computer environment, said method comprising:
specifying a complex task to be executed, said complex task comprising a plurality of independent, cooperating components; and
automatically collecting, substantially simultaneously, information from at least two of said plurality of independent, cooperating components regarding data flow among said plurality of independent, cooperating components, wherein said automatically collected information provides status of said complex task.

80. A system of managing complex tasks of a computer environment, said system comprising:
means for specifying a complex task to be executed, said complex task comprising a plurality of independent, cooperating components; and
means for automatically collecting, substantially simultaneously, information from at least two of said plurality of independent, cooperating components regarding data flow among said plurality of independent, cooperating components, wherein said automatically collected information provides status of said complex task.

81. An article of manufacture comprising:
at least one computer useable medium having computer readable program code means embodied therein for causing the managing of complex tasks of a computer environment, the computer readable program code means in said article of manufacture comprising:

computer readable program code means for causing a computing unit to specify a complex task to be executed, said complex task comprising a plurality of independent, cooperating components; and computer readable program code means for causing a computing unit to automatically collect, substantially simultaneously, information from at least two of said plurality of independent, cooperating components regarding data flow among said plurality of independent, cooperating components, wherein said automatically collected information provides status of said complex task.

* * * * *

UNITED STATES PATENT AND TRADEMARK OFFICE
CERTIFICATE OF CORRECTION

PATENT NO. : 6,044,394
DATED : March 28, 2000
INVENTOR(S) : Cadden et al.

It is certified that error appears in the above-identified patent and that said Letters Patent is hereby corrected as shown below:

Col. 11, line 28, delete "changed is" and replace with --changed ( ) is--.

Signed and Sealed this

Sixth Day of March, 2001

Attest:

NICHOLAS P. GODICI

Attesting Officer

Acting Director of the United States Patent and Trademark Office